United States Patent
Morris et al.

(10) Patent No.: US 10,638,104 B2
(45) Date of Patent: Apr. 28, 2020

(54) DEVICE, SYSTEM AND METHOD FOR GENERATING UPDATED CAMERA-PROJECTOR CORRESPONDENCES FROM A REDUCED SET OF TEST PATTERNS

(71) Applicant: CHRISTIE DIGITAL SYSTEMS USA, INC., Cypress, CA (US)

(72) Inventors: Ryan Thomas Morris, Kitchener (CA); Colin Bartlett Yardley, Waterloo (CA); Heewoo Ahn, Kitchener (CA); Eliezer Azi Ben-Lavi, Waterloo (CA); Chad Faragher, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days.

(21) Appl. No.: 16/378,659

(22) Filed: Apr. 9, 2019

(65) Prior Publication Data
US 2020/0092524 A1    Mar. 19, 2020

Related U.S. Application Data

(60) Provisional application No. 62/731,313, filed on Sep. 14, 2018.

(51) Int. Cl.
*H04N 9/31* (2006.01)
*H04N 17/00* (2006.01)
*G06T 7/80* (2017.01)

(52) U.S. Cl.
CPC ............. *H04N 9/3194* (2013.01); *G06T 7/80* (2017.01); *H04N 9/3147* (2013.01)

(58) Field of Classification Search
CPC ...... H04N 9/3194; H04N 9/31; H04N 9/3147; H04N 9/3185; H04N 9/3191;
(Continued)

(56) References Cited

U.S. PATENT DOCUMENTS

| | | | |
|---|---|---|---|
| 2009/0073324 A1* | 3/2009 | Tan | H04N 9/3185 348/745 |
| 2010/0225746 A1* | 9/2010 | Shpunt | H04N 13/218 348/50 |

(Continued)

OTHER PUBLICATIONS

Hartley, R., "Multiple View Geometry in Computer Vision", pp. 178 to 195, Cambridge Univ. Press., (2015), https://web.archive.org/web/20190117001205/https://en.wikipedia.org/wiki/Iterative_closest_point; date of link: Jun. 1, 2018.
(Continued)

*Primary Examiner* — Sherrie Hsia
(74) *Attorney, Agent, or Firm* — Perry + Currier, Inc.

(57) ABSTRACT

A device, system and method for generating updated camera-projector correspondences from a reduced set of test patterns is provided. When a predetermined correspondences between projector points and camera points in an initial relative position of a projector and a camera have been previously determined, a recalibration therebetween may occur by projecting a single test pattern derived from the predetermined correspondences to estimate movement therebetween. When the movement is too great to be estimated by a single test pattern, another test pattern may be projected to determine an estimation function for the movement and in particular, estimate movement of one or more camera points in the projected images due to relative movement of the projector and the camera from the initial relative position to a current relative position.

20 Claims, 10 Drawing Sheets

(58) Field of Classification Search
CPC .... H04N 9/3197; H04N 17/00; H04N 17/004; H04N 17/04; H04N 17/02; H04N 17/002; H04N 17/045; G06T 7/80; G06T 7/85; G06T 7/60
USPC ....... 348/181, 180, 187, 188, 744–747, 806, 348/807; 382/154, 151, 275, 285
See application file for complete search history.

(56) References Cited

U.S. PATENT DOCUMENTS

2011/0176007 A1    7/2011  Ding et al.
2014/0098224 A1*   4/2014  Zhang ................. G06T 7/60
                                              348/135

OTHER PUBLICATIONS

Hartley, Richard, and Andrew Zisserman. "7: Computation of the Camera Matrix P." Multiple View Geometry in Computer Vision, Cambridge University Press, 2015, pp. 178-195.
"Iterative Closest Point." Wikipedia, Wikimedia Foundation, Jan. 4, 2012, https://en.wikipedia.org/wiki/Iterative_Closest_Point. Retrieved from the Internet on Jun. 1, 2018 from Wayback Machine Web Archive. URL: https://web.archive.org/web/20190117001205/https://en.wikipedia.org/wiki/Iterative_closest_point.
EPO, Extended European Search Report, Feb. 17, 2020 re European Patent Application No. 19197338.7.
Sajadi, Behzad et al., "Autocalibrating tiled projectors on piecewise smooth vertically extruded surfaces." IEEE Transactions on Visualization and Computer Graphics 17.9 (2011): 1209-1222.
Zhang, B. et al., "Self-recalibration of a structured light system via plane-based homography." Pattern Recognition. Elsevier, GB, 40.4 (2007): 1368-1377.

* cited by examiner

DEVICE, SYSTEM AND METHOD FOR GENERATING UPDATED CAMERA-PROJECTOR CORRESPONDENCES FROM A REDUCED SET OF TEST PATTERNS

CROSS-REFERENCE TO RELATED APPLICATIONS

This application claims priority to U.S. 62/731,313, filed Sep. 14, 2018, the entirety of which is incorporated herein by reference.

BACKGROUND

Projection mapping is often a very complicated process due to the careful alignment of projectors required to align numerous two-dimensional ("2D") projected images onto a three-dimensional ("3D") surface. Hence, the pose of each of the projectors relative to the surface needs to be calibrated, which is often performed using cameras acquiring images of the physical object as a projector is projecting many calibration test patterns (e.g. structured light patterns) onto the surface. For example, the structured light patterns generally comprise a series of binary patterns that enable the position of projector pixels to be found on the surface. The number of calibration test patterns may number in the tens or hundreds or more and hence a calibration may take a considerable amount of time to implement. In particular, images of the structured light patterns on the surface, captured by a camera, may be compared with the actual structured light patterns to determine a geometry of the projectors with respect to the surface and/or the geometry of the surface. When a system undergoes perturbation or drift, then it needs to be corrected, or calibrated, again; such perturbation or drift may occur due to thermal effects and/or the projector and/or the camera and/or a surface onto which the projector is projecting being moved slightly. However, interrupting a projection mapping show to perform a full calibration using a full set of ten or more test patterns may be unacceptable.

BRIEF DESCRIPTIONS OF THE DRAWINGS

For a better understanding of the various embodiments described herein and to show more clearly how they may be carried into effect, reference will now be made, by way of example only, to the accompanying drawings in which.

DETAILED DESCRIPTION

An aspect of the specification provides a device comprising: a controller in communication with: a projector and a camera having a common field of view at a surface; and a memory storing predetermined correspondences between projector points and camera points in an initial relative position of the projector and the camera, the controller configured to: determine, from the predetermined correspondences, a function for mapping between the projector points and the camera points; control the projector to project, onto the surface, a first test pattern comprising: at least four projector points which cover a projected image field of the projector; control the camera to acquire a first image of the first test pattern; determine first imaged camera points in the first image; determine, using the function, corresponding camera points that correspond to the at least four projector points in the first test pattern; associate the first imaged camera points with the corresponding camera points to determine an estimation function for estimating movement of one or more of the camera points due to relative movement of the projector and the camera from the initial relative position to a current relative position; control the projector to project, onto the surface, a second test pattern comprising: a plurality of points determined from the predetermined correspondences, a number of the plurality of points of the second test pattern being greater than a respective number of points of the first test pattern; control the camera to acquire a second image of the second test pattern; determine second imaged camera points in the second image; generate updated correspondences between the camera points and the projector points in the current relative position using the estimation function and the second imaged camera points; and use the updated correspondences to control the projector to project images.

Figure 1:
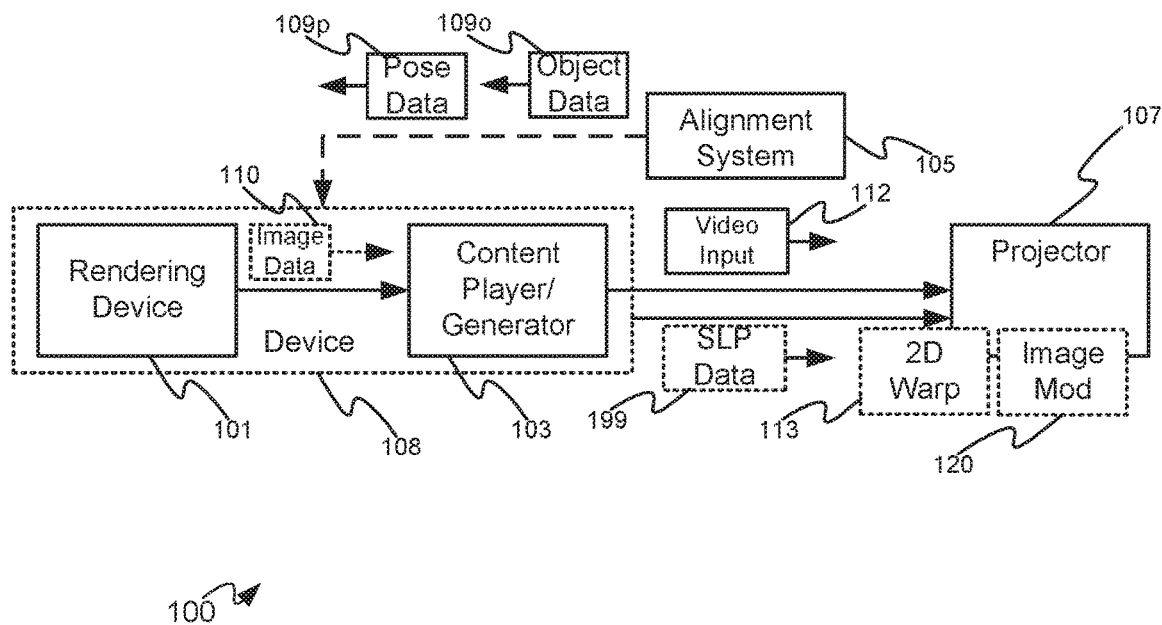
FIG. 1 depicts a projection system, according to non-limiting embodiments.

Another aspect of the specification provides a method comprising: determining, at a controller of a computing device, from predetermined correspondences between projector points and camera points in an initial relative position of a projector and a camera having a common field of view at a surface, a function for mapping between the projector points and the camera points; controlling, using the controller, the projector to project, onto the surface, a first test pattern comprising: at least four projector points which cover a projected image field of the projector; controlling, using the controller, the camera to acquire a first image of the first test pattern; determining, using the controller, first imaged camera points in the first image; determining, via the controller using the function, corresponding camera points that correspond to the at least four projector points in the first test pattern; associating, using the controller, the first imaged camera points with the corresponding camera points to determine an estimation function for estimating movement of one or more of the camera points due to relative movement of the projector and the camera from the initial relative position to a current relative position; controlling, using the controller, the projector to project, onto the surface, a second test pattern comprising: a plurality of points determined from the predetermined correspondences, a number of the plurality of points of the second test pattern being greater than a respective number of points of the first test pattern; controlling, using the controller, the camera to acquire a second image of the second test pattern; determining, using the controller, second imaged camera points in the second image; generating, using the controller, updated correspondences between the camera points and the projector points in the current relative position using the estimation function and the second imaged camera points; and using, at the controller, the updated correspondences to control the projector to project images FIG. 1 depicts a system 100 comprising: a rendering device 101 (interchangeably referred to hereafter as the rendering device 101); a content player 103 (and/or content generator); an alignment system 105; and a projector 107. In general, the rendering device 101 is in communication with content player 103 and optionally alignment system 105, and content player 103 is in communication with projector 107.

As depicted, the rendering device 101 and the content player 103 are combined into one device 108, however in other implementations the rendering device 101 and the content player 103 can be separate devices. The alignment system 105 may be configured to generate pose data 109p comprising at least data defining geometric relationships between, for example, the projector 107 and objects onto which the projector 107 projects. Generally, the pose data 109p comprises a location of the projector 107 (e.g. in "x,y,z" coordinates relative to the object) and an orientation of the projector 107 (e.g. a "yaw", a "pitch" and a "roll" relative to the object). However, the pose data 109p may also comprise intrinsic properties of the projector 107, such as lens characteristics, and the like.

The rendering device 101 can generate rendered image data 110, for example by rendering existing image data (not depicted) for projection by the projector 107. The image data 110 may generally comprise two-dimensional images. The content player 103 may combine the image data 110 with the pose data 109p (and object data 109o) received by the alignment system 105 to produce video input 112, which comprises the image data 110 altered for a perspective for projection on an object by the projector 107. In FIG. 1, solid lines connecting components show flow of image and/or video data there between, while the stippled line connecting the alignment system 105 to the rendering device 101 and/or device 108 shows flow of the pose data 109p and the object data 109o there between. The object data 109o generally comprises a model of a location and orientation of the object onto which images from the projector 107 are projected, and can be provided with the object and/or determined by the alignment system 105 using one or more cameras.

When the rendering device 101 and the content player 103 are separate, the rendering device 101 communicates the image data 110 to the content player 103, which processes and/or "plays" the image data 110 by producing the video input 112 suitable for processing and projection by the projector 107. For example, the image data 110 can include, but is not limited to, an AVI file, a series of JPG files, a PNG file, and the like. The video input 112 can include, but is not limited to, High-Definition Multimedia Interface (HDMI) data, Digital Visual Interface (DVI) data, DisplayPort (DP) data, Video over Internet Protocol (IP) data, Video Graphics Array (VGA) data, and/or video transport data.

When the rendering device 101 and the content player 103 are combined in device 108, device 108 can render the video input 112 (e.g. video data) in real-time without producing the image data 110. In any event, the video input 112 is communicated to the projector 107 by the content player 103 where the video input 112 is used to control the projector 107 to project images based thereupon, for example onto a three-dimensional object. The video input 112 may comprise images for projection onto the three-dimensional object, for example the image data 110 altered for the perspective of the projector 107 relative to the three-dimensional object, as determined using the pose data 109p and/or the object data 109o; however the video input 112 may further comprise the pose data 109p, extrinsic properties of the projector 107, settings for the projector, and the like.

The rendering device 101 generally comprises an image generator and/or renderer, for example a computing device, a server and the like, configured to generate and/or render images as the image data 110. Such the image data 110 can include, but is not limited to, still images, video and the like. Furthermore, though not depicted, the rendering device 101 can be in communication with, and/or comprise, an image generator and/or a memory storing data from which the image data 110 can be generated and/or rendered. Alternatively, the rendering device 101 can generate the image data 110 using algorithms, and the like, for generating images.

The content player 103 comprises a player configured to "play" and/or render the image data 110 for example according to the pose data 109p. When the image data 110 comprises video data, the content player 103 is configured to play and/or render the video data by outputting the video input 112 for projection by the projector 107. Hence, the content player 103 can include, but is not limited to a video player, a video processing device, a computing device, a server, and the like. However, as described above, when the rendering device 101 and the content player 103 are combined as device 108, rendering of the image data 110 can be eliminated and device 108 renders the video input 112 without producing the image data 110.

The projector 107 comprises a projector configured to project the video input 112, including but not limited to a digital projector, a cinema projector, an LCOS (Liquid Crystal on Silicon) based projector, a DMD (digital micromirror device) based projector and the like. Furthermore, while only one the projector 107 is depicted, system 100 can comprise a plurality of projectors 107, each configured to project respective projection data comprising, for example, portions of larger tiled image to be projected. Regardless of a technology used in the projector 107, it is assumed that the projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 further comprises one or more 2D ("two-dimensional") warping devices and/or modules 113, for example at the projector 107 (though such a warping device can be present at the content player 103 and/or as a stand-alone device) The video input 112 can be warped by the warping module 113, for example by moving and/or adjusting pixels within the video input 112, to adjust the video input 112 for projection by the projector 107 onto an object including, but not limited to, a screen, an object and the like. In some implementations, the warping module 113 can be used to make small changes to projection of images onto a physical object, for example when a virtual model of the object used to produce the images does not precisely match the physical object. Furthermore, the warping module 113, and the like, may be used to alter the video input 112 to blend images projected in a multi-projector system.

Indeed, in general, the alignment system 105 comprises any suitable combination of projectors (including the projector 107), cameras (not depicted in FIG. 1), and computing devices which may be configured to one or more of: automatically determine the pose data 109p of the projector 107; automatically determine updated pose data 109p of the projector 107; automatically determine warping data; automatically determine blending data and optionally automatically determine the object data 109o. Non-limiting implementations of the alignment system 105 will be described below with reference to FIG. 2 to FIG. 10.

Also depicted in FIG. 1, system 100 optionally further comprises one or more image modification devices and/or modules 120, for example at the projector 107 (though such an image modifications device can be present at content player and/or as a stand-alone device) When present, video input 112 can be modified by the image modification module 120, for example, by altering the video input 112 to include other images, such as structured light patterns, as described in more detail below. In some embodiments warping module 113 and the image modification module 120 may be integrated with each other. The image modification module 120 may be external to, or integrated with, the projector 107. In yet further embodiments, functionality of the image modification module 120 may be integrated with the projector 107. In some embodiments, the image modification module 120 may be controlled by the alignment system 105.

While each of the rendering device 101, the content player 103, the alignment system 105, and the projector 107 are depicted as distinct components, in other implementations, respective portions of one or more of the rendering device 101, the content player 103, the alignment system 105, and the projector 107 and can be implemented within the same device (e.g. device 108) and/or processing resources can be shared there between including, but not limited to, in a cloud computing arrangement. For example, while not depicted, system 100 comprises one or more controllers, one or more processors, one or more memories and one or more communication interfaces, for example a controller, memory and communication interface for each of the rendering device 101, the content player 103, the alignment system 105, and the projector 107 and/or to be shared among the rendering device 101, the content player 103, the alignment system 105, and the projector 107. Indeed, in general, components of system 100, as depicted, represent different functionality of a projection system where: the pose data 109p of the projector 107 can be automatically determined. In some implementations, system 100 includes components and/or functionality for projection mapping onto three-dimensional objects and/or for updating the pose data 109p when the projector 107 moves, and/or a screen and/or object, onto which images are being projected, moves.

As depicted, the device 108 and, the like is furthermore providing structured light pattern data 199 to the projector 107, for example for incorporation into images to be projected by the projector 107, as described below. For example, one or more of the rendering device 101, the content player 103 and the device 108 may store the structured light pattern data 199 and provide to the projector 107. In other embodiments, the projector 107 may be preconfigured with the structured light pattern data 199

Figure 2:
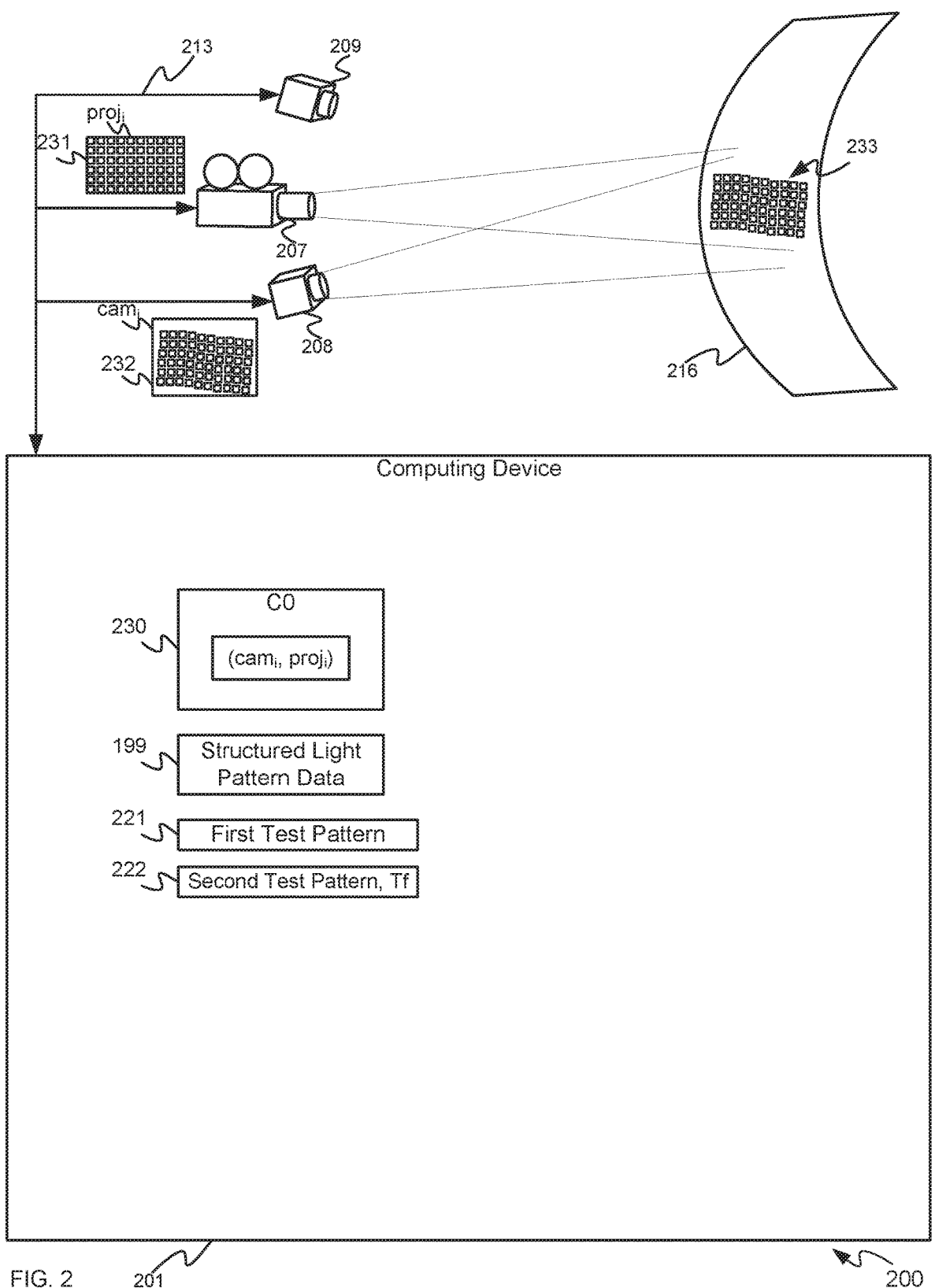
FIG. 2 depicts a system for generating updated camera-projector correspondences from a reduced set of test patterns, which can be used in the system of FIG. 1, according to non-limiting embodiments.

Attention is next directed to FIG. 2 which depicts a system 200 for generating updated camera-projector correspondences from a reduced set of test patterns. Indeed, the alignment system 105 can comprise the system 200, and furthermore components of the system 100 can comprise components of the system 200 as desired.

The system 200 comprises a computing device 201 interchangeably referred to hereafter as the device 201), at least one projector 207 and at least one camera 208, 209 that are arranged relative to a physical object onto which images are to be projected, for example in a projection mapping "show"; as depicted the physical object comprises a three-dimensional surface 216, however projection mapping may occur on any physical object. While only one projector 207 and two camera 208, 209 are depicted, the system 200 may comprise any number of projectors and camera including, but not limited to (as depicted) one projector and one camera. Furthermore, while not depicted in FIG. 2, as described below with respect to FIG. 3, the device 201 comprises a controller, a memory and communication interface.

In particular, the field of view of each camera 208, 209 overlaps with at least a portion of a field of view of the projector 207 such that each camera 208, 209 may capture images of images projected by the projector 207. In some examples, as depicted, the camera 208 is arranged and/or configured to acquire images of the entirety of projected images projected onto the surface 216 by the projector 207. Hence, in examples described hereafter, functionality of the device 201 will be described with respect to the one projector 207 and the one camera 208, though functionality of the device 201 may include combining images of the projected images, as projected onto the surface 216 by the projector 207, from each of the cameras 208, 209. Furthermore, each of the camera 208, 209 generally comprise an electronic and/or digital camera and/or video camera including, but not limited to charge couple device (CCD) based cameras.

As depicted, the device 201 comprises a computing device that may control the projector 207 to project images and test patterns, including, but not limited to, structured light patterns, and further control the camera 208 to acquire images of the test patterns. The device 201 may be a device of the alignment system 105 and/or another computing device.

As depicted, the device 201 is in communication with the projector 207 and the camera 208 via respective wired and/or wireless communication links 213.

In some example embodiments, the device 201 may control the projector 207 and the camera 208 to switch between several calibration modes for calibrating the system 200. Such calibration modes include: performing a full calibration using a plurality of structured light patterns; a first recalibration mode for performing a recalibration using one test pattern; and a second recalibration mode performing a recalibration using two test patterns. Hence, for example, the device 201 may store in a memory, and/or have access to a memory that stores: the structured light pattern data 199, a first test pattern 221, and a second test pattern 222 (also referred to as test pattern Tf hereafter), described in more detail below.

For example, the projector 207 may be configured to project structured light patterns as part of a full calibration the system 200 using the structured light pattern data 199 which may comprise ten or more structured light patterns (e.g. independent structures (e.g. non-overlapping) centered around given projector pixels, vertical and horizontal stripes of increasing or decreasing resolution, checkerboard patterns of increasing or decreasing resolution, and the like, and/or data for generating such structured light patterns).

The structured light patterns maybe be received at the projector 207 via the structured light pattern data and integrated into the images being projected by the projector 207 as part of a projection mapping show, for example at a rate that is that is not visible according to a human visual system model, for example as a bitplane within each frame of images being projected (e.g. at 60 Hz) and/or a rate that is greater than 10 frames per second.

However a person of skill in the art understands that the system 200 has been previously calibrated using such structured light pattern data 199 and hence stores predetermined correspondences 230 (also labelled as C0 in FIG. 2) between projector points (labelled as $proj_i$ in FIG. 2) and camera points (labelled as $cam_i$ in FIG. 2) in an initial relative position of the projector 207 and the camera 208. For example, the projector points $proj_i$ may correspond to pixels of the projector 207 (e.g. DMD based pixels) and the camera points $cam_i$ may correspond to pixels and/or sensor locations of the camera 208 (e.g. CCD based pixels and/or sensors); however, the correspondences may not be in a one-to-one relationship with the pixels of the projector 207 and/or the pixels of the camera 208.

As depicted, for example, the projector 207 is projecting a full field image 231 onto the surface 216 (e.g. using all the pixels of the projector 207) and the camera 208 is acquiring an image 232 of the full field image 231 as projected onto the surface 216 as a projected image 233. However, as the projected image 233 is distorted, as compared to the full field images 231, due to the curves and/or orientation and the like of the surface 216, the image 232 includes camera points $cam_i$ that correspond to the projector points $proj_i$, and camera points $cam_i$ that do not correspond to the projector points $proj_i$. Such correspondences between the projector points $proj_i$, and the camera points $cam_i$ are store in the predetermined correspondences 230 as pairs ($cam_i$, $proj_i$) of camera points $cam_i$ and projector points $proj_i$; while only one "$i^{th}$" pair ($cam_i$, $proj_i$) is depicted, a person of skill in the art understands that the predetermined correspondences 230 comprise a plurality of pairs ($cam_i$, $proj_i$) of camera points $cam_i$ and projector points $proj_i$. For example, in some examples (e.g. for 16:9 aspect ratio images, and the like) the predetermined correspondences 230 may include 15×20 pairs ($cam_i$, $proj_i$), The predetermined correspondences 230 are generally used to derive and/or generate warping data and/or blending data and/or the pose data 109p for projecting images.

Hence, a person of skill in the art understands that the system 200 has been calibrated at least once, for example in a first calibration mode, as represented by the predetermined correspondences 230, and that it is desirable to run a faster process that determines when the system 200 has "drifted" (e.g. one or more relative positions of the projector 207, the camera 208 and/or the surface 216 have changed), and can correct the system 200 to determine updated camera-projector correspondences (e.g. to recalibrate the system 200 to derive updated warping data and/or blending data and/or the pose data 109p for projecting images).

As described above the system 200 and/or the device 201 may be operated into two recalibration modes, as described hereafter.

Figure 3:
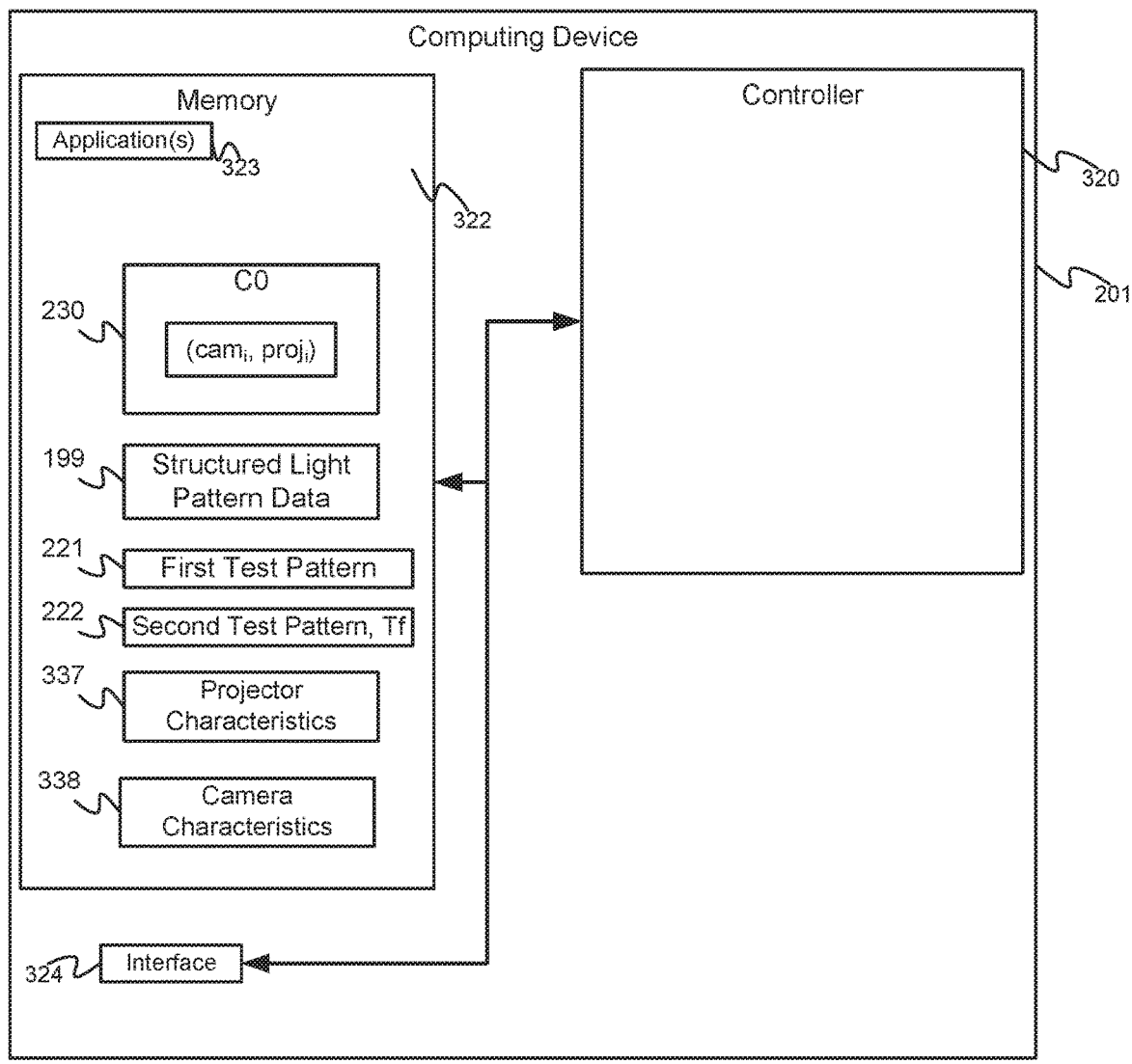
FIG. 3 depicts a block diagram of a computing device for generating updated camera-projector correspondences from a reduced set of test patterns, which can be used in the system of FIG. 1, according to non-limiting embodiments.

Details of the device 201 are now described with respect to FIG. 3. The device 201, can comprise any suitable computing device, including but not limited to a graphics processing unit (GPU), a graphics processing device, a graphics processing engine, a video processing device, a personal computer (PC), a server, and the like, and generally comprises: a controller 320; a memory 322 storing one or more applications 323, the structured light pattern data 199, the first test pattern 221 and the second test pattern 222; and a communication interface 324 (interchangeably referred to hereafter as the interface 324). While the memory 322 is depicted as internal to the device 201, the memory 322 may be external to the device 201 and the controller 320 may have access to the memory 322 via the interface 324. Furthermore, while the first test pattern 221 and the second test pattern 222 are depicted as stored in the memory 322, the test patterns 221, 222 may alternatively be generated by the controller 320, for example when the controller 320 is implementing the one or more applications 323; in particular, the memory 322 may alternatively store data for generating the test patterns 221, 222. The test patterns 221, 222 will be described in further detail below.

Each of the one or more applications 323 may be similar, but for a different mode and/or calibration mode of the system 200 and/or the device. For simplicity, the one or more applications 323 will be interchangeably referred to hereafter as the application 323.

As depicted, the memory 322 may further store characteristics 337 of the projector 207 (e.g. intrinsic characteristics and/or extrinsic characteristics and which may include determined pose data of the projector 207, such as the pose data 109p) and characteristics 338 of the camera 208 (e.g. intrinsic characteristics and/or extrinsic characteristics and which may include determined pose data of the camera 208). While not depicted, the memory 322 may further store a model of the surface 216, which may be obtained from a mathematical description (when available) and/or using laser-scanning techniques, and/or a computer aided drawing (CAD) model of the surface 216 may be available. In particular, characteristics 337 of the projector 207 and the model of the surface 216 may be used to determine the pose data 109p of the projector 207 by the structured light pattern data 199, with the images of structured light patterns, when projected by the projector 207 and captured by the camera 208.

The interface 324 comprises any suitable wired or wireless communication interface configured to communicate with the projector 207 and the camera 208, 209. The interface 324 may communicate in a wired and/or wireless manner as desired including, but not limited using cables, WiFi communication links, Bluetooth™ communication links, personal area networks, local area networks, and the like.

The controller 320 can comprise a processor and/or a plurality of processors, including but not limited to one or more central processors (CPUs) and/or one or more graphics processing units (GPUs) and/or one or more processing units; either way, the controller 320 comprises a hardware element and/or a hardware processor. Indeed, in some implementations, the controller 320 can comprise an ASIC (application-specific integrated circuit) and/or an FPGA (field-programmable gate array) specifically configured for generating updated camera-projector correspondences from a reduced set of test patterns. Hence, the device 201 may preferably not be a generic computing device, but a device specifically configured to implement specific functionality for generating updated camera-projector correspondences from a reduced set of test patterns. For example, the device 201 and/or the controller 320 can specifically comprise a computer executable engine configured to implement functionality for generating updated camera-projector correspondences from a reduced set of test patterns.

The memory 322 can comprise a non-volatile storage unit (e.g. Erasable Electronic Programmable Read Only Memory ("EEPROM"), Flash Memory) and a volatile storage unit (e.g. random-access memory ("RAM")). Programming instructions that implement the functional teachings of the device 201 as described herein are typically maintained, persistently, in the memory 322 and used by the controller 320 which makes appropriate utilization of volatile storage during the execution of such programming instructions. Those skilled in the art recognize that the memory 322 is an example of computer readable media that can store programming instructions executable on the controller 320. Furthermore, the memory 322 is also an example of a memory unit and/or memory module and/or a non-volatile memory.

In particular, the memory 322 stores the application 323 that, when processed by the controller 320 in a first recalibration mode, enables the controller 320 and/or the device 201 to: control the projector 207 to project, onto the surface 216, a test pattern 222 (e.g. the second test pattern) comprising: a plurality of points determined from the predetermined correspondences 230; control the camera 208 to acquire an image of the test pattern as projected onto the surface 216; determine imaged camera points in the image of the test pattern as projected onto the surface 216; generate updated correspondences between the camera points and the projector points in a current relative position using the imaged camera points by: bijectively associating the imaged camera points to the camera points $cam_i$ of the predetermined correspondences 230; and bijectively associating the imaged camera points to the projector points $proj_i$ that correspond to the bijectively associated camera points $cam_i$. The updated correspondences may then be used to control the projector 207 to project images, for example by redetermining warping data and/or blend data and/or the pose data 109p using the updated correspondences.

Hence, in the first recalibration mode, the device 201 and/or system 200 uses one test pattern (e.g. the second test pattern 222) to recalibrate the system 200. However, a person of skill in the art understands that this mode may be successful in recalibrating the system 200 only when the drift in the system 200 is small enough to successfully bijectively associate the imaged camera points to the camera points $cam_i$ of the predetermined correspondences 230, for example using a nearest neighbor approach and the like.

When a bijective association between the imaged camera points to the camera points $cam_i$ cannot be determined, the controller 320 may process the application 323 in a second recalibration mode, that enables the controller 320 and/or the device 201 to: determine, from the predetermined correspondences 230, a function for mapping between the projector points $proj_i$ and the camera points $cam_i$, control the projector 207 to project, onto the surface 216, the first test pattern 221 comprising: at least four projector points which cover a projected image field of the projector 207; control the camera 208 to acquire a first image of the first test pattern 221; determine first imaged camera points in the first image; determine, using the function, corresponding camera points $cam_i$ that correspond to the at least four projector points in the first test pattern; associate the first imaged camera points with the corresponding camera points $cam_i$ to determine an estimation function for estimating movement of one or more of the camera points $cam_i$ due to relative movement of the projector 207 and the camera 208 from the initial relative position to a current relative position; control the projector 207 to project, onto the surface 216, the second test pattern 222 comprising: a plurality of points determined from the predetermined correspondences 230, a number of the plurality of points of the second test pattern being greater than a respective number of points of the first test pattern 221; control the camera 208 to acquire a second image of the second test pattern 222; determine second imaged camera points in the second image; generate updated correspondences between the camera points $cam_i$ and the projector points $proj_i$ in the current relative position using the estimation function and the second imaged camera points. The updated correspondences may then be used to control the projector 207 to project images, for example by redetermining warping data and/or blend data and/or the pose data 109p using the updated correspondences.

Hence, in the second recalibration mode, the device 201 and/or system 200 uses two test patterns (e.g. the first test pattern 221 and the second test pattern 222) to recalibrate the system 200. However, a person of skill in the art understands that this mode may be successful in recalibrating the system 200 only when the drift in the system 200 is small enough to successfully bijectively associate the first imaged camera points in the first image to the camera points $cam_i$ that correspond to the at least four projector points in the first test pattern. Indeed, a person skilled in the art will understands that with a very small number of points in the first test pattern 221 (e.g. at least 4 points, and up to 10 points, though numbers of points larger than 10 are within the scope of the present specification), that this bijective association may be successful (e.g. using a nearest neighbour approach) for drifts that will typically occur in a projector system When a bijective association between the first imaged camera points in the first image to the camera points $cam_i$ cannot be determined, the controller 320 may process the application 323 in a full recalibration mode and fully recalibrate the system using a full set of structured test patterns using the structured light pattern data 199.

The estimation function determined may depend on the number of points in the first test pattern 221, as well as whether the camera characteristics 338 are available to the controller 320, as described in more detail below.

Furthermore, the second recalibration mode may be implemented independent of the first recalibration mode. In particular, the system 200 may recalibrate using the second recalibration mode without first attempting to recalibrate using the first recalibration mode.

Furthermore, in any of the calibration and/or recalibration modes the device 201 and/or the system 200 may be configured to control the projector 207 to project the test patterns 221, 222 and/or the structured light patterns subliminally within an on-going projection mapping show, for example as bitplanes in frames images of the projection mapping show and/or a rate not visible according to a human visual system model, and synchronize the camera 208 to acquire images of the test patterns 221, 222 and/or the structured light patterns, for example using switches, triggering cables between the projector 207 and the camera 208, synchronization signals and the like, for example as described in Applicant's co-pending U.S. patent application Ser. No. 15/969,049 incorporated herein by reference.

Figure 4:
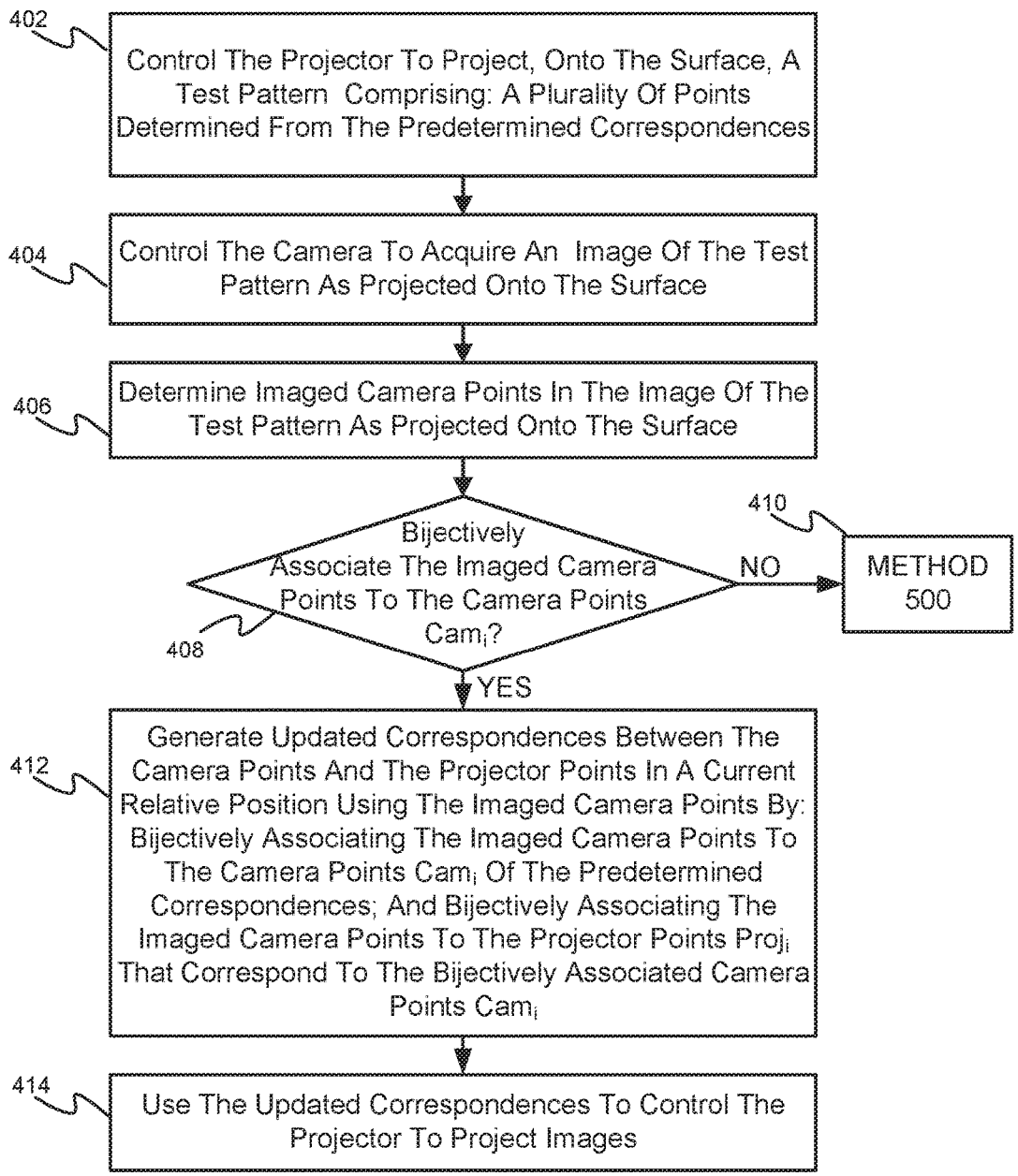
FIG. 4 depicts a method for generating updated camera-projector correspondences from a reduced set of test patterns according to a first recalibration mode, and according to non-limiting embodiments.

Attention is now directed to FIG. 4 which depicts a flowchart of a method 400 for generating updated camera-projector correspondences from a reduced set of test patterns according to a first recalibration mode, and according to non-limiting embodiments. In order to assist in the explanation of the method 400, it will be assumed that the method 400 is performed using the system 200, and at least partially by the controller 320 of the device 201, for example when the controller 320 processes application 323 in the first recalibration mode. Indeed, the method 400 is one way in which the systems 100, 200 and/or the device 201 can be configured. Furthermore, the following discussion of the method 400 will lead to a further understanding of the device 201, and the systems 100, 200 and its various components. However, it is to be understood that the systems 100, 200 and/or the device 201 and/or the method 400 can be varied, and need not work exactly as discussed herein in conjunction with each other, and that such variations are within the scope of present embodiments.

Regardless, it is to be emphasized, that the method 400 need not be performed in the exact sequence as shown, unless otherwise indicated; and likewise, various blocks may be performed in parallel rather than in sequence; hence the elements of the method 400 are referred to herein as "blocks" rather than "steps". It is also to be understood, however, that the method 400 can be implemented on variations of the system 200 as well. Furthermore, while the device 201 is described as implementing and/or performing at least a portion of the blocks of the method 400, it is appreciated that such blocks of the method 400 occur using the controller 320 processing application 323.

At a block 402, the controller 320 controls the projector 207 to project, onto the surface 216, a test pattern 222 (e.g. the second test pattern 222) comprising: a plurality of points determined from the predetermined correspondences 230. For example, the test pattern 222 may comprise blocks and/or squares centered around each of the projector points $proj_i$ of the predetermined correspondences 230 in a one-to-one relationship, with the center of each of the blocks and/or squares corresponding to the projector points $proj_i$ of the predetermined correspondences 230. In particular, the test pattern 222 may comprise a full field test pattern of "structures" (e.g. squares, rectangles and the like, and/or any suitable shape) that correspond to all the pixels of the projector 207 for which updated camera-projector correspondences are to be determined, with a center of each of the structures corresponding to the projector points $proj_i$ of the predetermined correspondences 230. In some examples, a 15×20 grid of squares may be projected and/or a grid of structures of the same number and/or arrangement as the pairs ($cam_i$, $proj_i$). The test pattern 222 may be inserted as a bitplane into one or more frames of images being projected by the projector 207 in a projection mapping show. When the test pattern 222 has not previously been stored and/or generated, the block 402 may include generating the test patterns 222, for example from data stored in the application 323 and/or the memory 322.

At a block 404, the controller 320 controls the camera 208 to acquire an image of the test pattern 222 as projected onto the surface 216. The controller 320 may synchronize acquisition of the image of the test pattern 222 as projected onto the surface 216 with the projection of the test pattern 222 via synchronization signals, and the like.

At a block 406, the controller 320 determines imaged camera points in the image of the test pattern 222 as projected onto the surface 216. For example, image analysis techniques and/or machine vision techniques may be used to determine the center of each of the structures and/or blocks and/or squares in the image of the test pattern 222, with each of the centers comprising an imaged camera point.

At a block 408, the controller 320 determines whether the imaged camera points may be bijectively associated with camera points $cam_i$ of the predetermined correspondences 230, for example using a nearest neighbor approach, and the like. In particular such bijective association may comprise determining that each imaged camera point, in the image of the test pattern 222 as projected onto the surface 216, corresponds to one camera point $cam_i$ of the predetermined correspondences 230; put another way, such bijective association may comprise determining that a one-to-one association exists between the imaged camera points and the camera points $cam_i$ of the predetermined correspondences 230.

When such a bijective association cannot be determined (e.g. a "NO" determination at the bock 408 and/or one or more of the imaged camera points corresponds to at least two camera points $cam_i$ of the predetermined correspondences 230), at a block 410, the controller 320 implements a method 500 for generating updated camera-projector correspondences from a reduced set of test patterns according to a second recalibration mode using two test patterns, and described below with respect to FIG. 5.

However, when such a bijective association can be determined (e.g. a "YES" determination at the bock 408 and/or each of the imaged camera points corresponds to one camera point $cam_i$ of the predetermined correspondences 230), at a block 412, the controller 320 generates updated correspondences between the camera points and the projector points $proj_i$ in a current relative position (e.g. of the projector 207 and the camera 208) using the imaged camera points by: bijectively associating the imaged camera points to the camera points $cam_i$ of the predetermined correspondences 230; and bijectively associating the imaged camera points to the projector points $proj_i$ that correspond to the bijectively associated camera points $cam_i$. A person of skill in the art understands that the block 408 may be performed at least partially in parallel with the block 412 and/or the bijective associations determined at the block 408 may be used in generating the updated correspondences in the block 412.

At a block 414, the controller 320 may use the updated correspondences to control the projector 207 to project images, for example by redetermining warping data and/or blend data and/or the pose data 109p using the updated correspondences.

While the method 400 is described with respect to one camera 208 acquiring images of the test pattern 222 projected onto the surface 216, when the camera 208 is arranged to acquire only a portion of the test pattern 222 as projected by the projector 207 onto the surface 216, the controller 320 may be in further communication with one or more second cameras 209 arranged to acquire a remaining portion of the test pattern 222 as projected by the projector 207 onto the surface 216, and the imaged camera points, that correspond to the projector points $proj_i$, may include respective camera points from images of the test pattern 222 acquired by both the camera 208 and the one or more second cameras 209.

Figure 5:
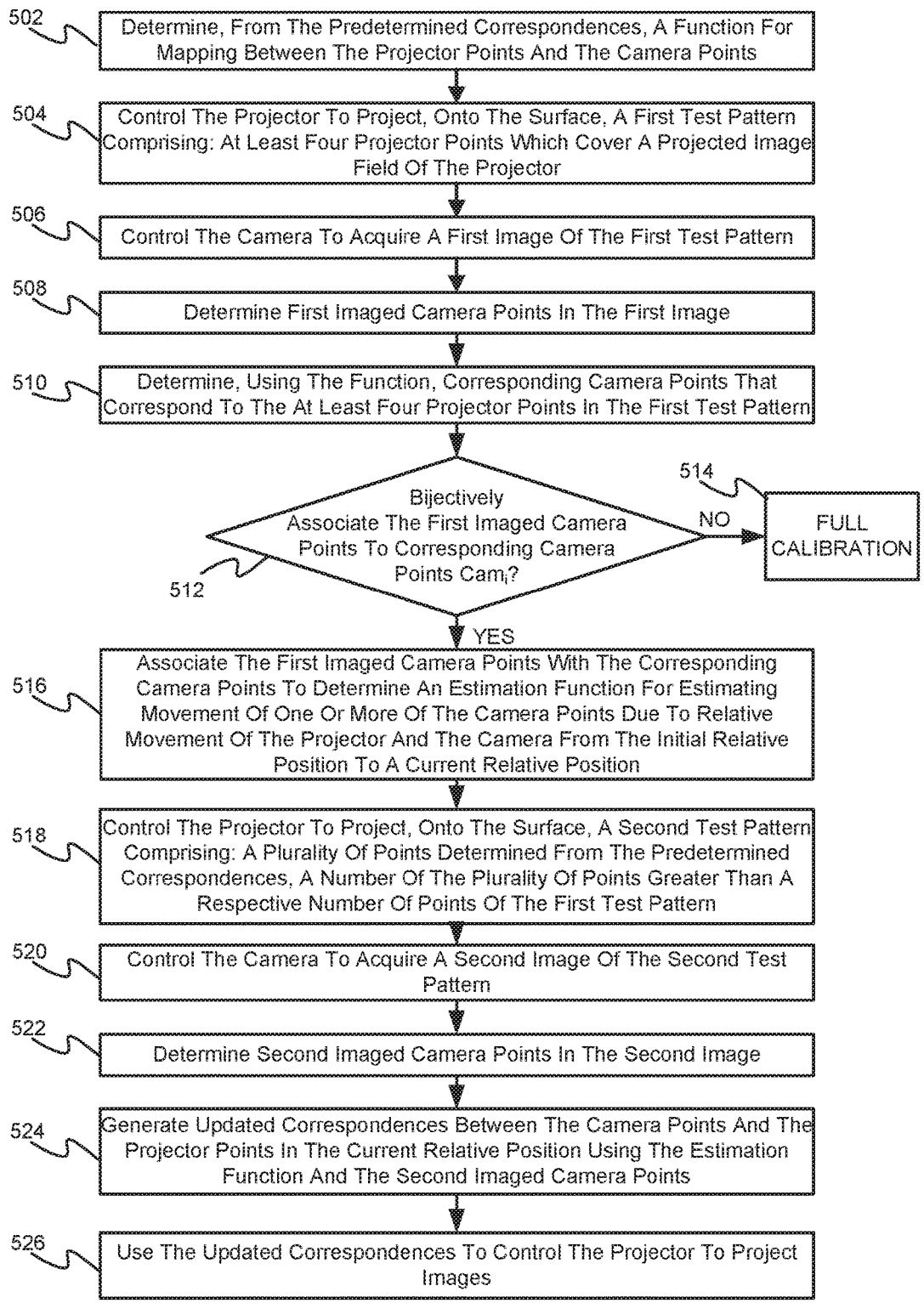
FIG. 5 depicts a method for generating updated camera-projector correspondences from a reduced set of test patterns according to a second recalibration mode, and according to non-limiting embodiments.

Attention is now directed to FIG. 5 which depicts a flowchart of a method 500 for generating updated camera-projector correspondences from a reduced set of test patterns according to a second recalibration mode, and according to non-limiting embodiments. A person of skill in the art understands that the method 500 may be implemented at the block 410 of the method 400 and/or the method 500 may be implemented without implementing the method 400.

In order to assist in the explanation of the method 500, it will be assumed that the method 500 is performed using the system 200, and at least partially by the controller 320 of the device 201, for example when the controller 320 processes application 323 in the second recalibration mode. Indeed, the method 500 is one way in which the systems 100, 200 and/or the device 201 can be configured. Furthermore, the following discussion of the method 500 will lead to a further understanding of the device 201, and the systems 100, 200 and its various components. However, it is to be understood that the systems 100, 200 and/or the device 201 and/or the method 500 can be varied, and need not work exactly as discussed herein in conjunction with each other, and that such variations are within the scope of present embodiments.

Regardless, it is to be emphasized, that the method 500 need not be performed in the exact sequence as shown, unless otherwise indicated; and likewise, various blocks may be performed in parallel rather than in sequence; hence the elements of the method 500 are referred to herein as "blocks" rather than "steps". It is also to be understood, however, that the method 500 can be implemented on variations of the system 200 as well. Furthermore, while the device 201 is described as implementing and/or performing at least a portion of the blocks of the method 500, it is appreciated that such blocks of the method 500 occur using the controller 320 processing application 323.

At a block 502, the controller 320 determines, from the predetermined correspondences 230, a function for mapping between the projector points and the camera points which may include but is not limited to the specific projector points $proj_i$ and the camera points $cam_i$ stored in the predetermined correspondences 230. However, a person of skill in the art understands that the function generally maps between projector space (e.g. any suitable projector points) of the projector 207 and camera space (e.g. any suitable camera points) of the camera 208 in the initial relative position.

At a block 504, the controller 320 controls the projector 207 to project, onto the surface 216, the first test pattern 221 comprising: at least four projector points which cover a projected image field of the projector 207, similar to as described above with respect to block 402.

At a block 506, the controller 320 controls the camera 208 to acquire a first image of the first test pattern 221, similar to as described above with respect to block 404.

At a block 508, the controller 320 determines first imaged camera points in the first image, similar to as described above with respect to block 406.

At a block 510, the controller 320 determines, using the function determined at the block 502, corresponding camera points $cam_j$ that correspond to the at least four projector points in the first test pattern 221. For example, using the at least four projector points in the first test pattern 221 as input to the function, the corresponding camera points $cam_j$ that correspond to the at least four projector points in the first test pattern 221 are determined as output of the function. The notation "$cam_j$" for the corresponding camera points to distinguish the corresponding camera points $cam_j$ from the camera points $cam_i$ of the predetermined correspondences; indeed, the at least four proctor points of the first test pattern 221 and/or the corresponding camera points $cam_j$ may or may not directly correspond to the projector points $proj_i$ and the camera points $cam_i$ of the predetermined correspondences.

Regardless, the at least four projector points in the first test pattern 221 may be selected to: cover the projected image field of the projector 207; be separated by respective distances that enable the projector 207 and the camera 208 to move relative to each other, and relative to an initial relative position therebetween, such that the camera 208 acquires the at least four projector points in the first image; and be inset from edges of the first image as projected onto the surface 216.

In some examples, the at least four projector points in the first test pattern 221 may be selected to include four points including: points at each of four corners of the first test pattern 221. In other examples, the at least four projector points in the first test pattern 221 may be selected to include five points including: points at each of four corners of the first test pattern 221; and a point at about a middle of the first test pattern 221. In yet further examples, the at least four projector points in the first test pattern 221 may be selected to include six or more points including: points at each of four corners of the first test pattern 221; and two points between the points at each of four corners of the first test pattern 221.

In general, the locations of the points in the first test pattern 221 are selected to avoid extrapolation when determining locations of other projector points such that locations of other projector points may be determined through interpolation.

At a block 512, the controller 320 determines whether the first imaged camera points may be bijectively associated with camera points $cam_j$ that correspond to the at least four projector points of the first test pattern 221, for example using a nearest neighbor approach, and the like. In particular such bijective association may comprise determining that each first imaged camera point, in the image of the first test pattern 221 as projected onto the surface 216, corresponds to one of the camera points $cam_j$ that correspond to the at least four projector points of the first test pattern 221; put another way, such bijective association may comprise determining that a one-to-one association exists between the imaged camera points the camera points $cam_j$ that correspond to the at least four projector points of the first test pattern 221.

When such a bijective association cannot be determined (e.g. a "NO" determination at the block 512 (e.g. one or more of the first imaged camera points corresponds to at least two camera points $cam_j$)), at a block 514, the controller 320 performs a full calibration to fully regenerate correspondences between the projector points and the camera points using a plurality of structured light test patterns as represented by the structured light pattern data 199. In these examples, the drift in the system 200 is hence too large for use of either of the methods 400, 500 to recalibrate the system 200

When such a bijective association can be determined (e.g. a "YES" determination at the block 512 (e.g. each of the first imaged camera points corresponds to one camera point $cam_j$), at a block 516, the controller 320 associates the first imaged camera points with the corresponding camera points $cam_j$ to determine an estimation function for estimating movement of one or more of the camera points $cam_j$ due to relative movement of the projector 207 and the camera 208 from the initial relative position to a current relative position. The estimation function may depend on a number of the at least four projector points in the first test pattern 221 and whether or not the camera characteristics 338 are available to the controller 320; determination of the estimation function will be described in more detail below.

Furthermore, the controller 320 may be further configured to associate the first imaged camera points with the corresponding camera points $cam_j$ based on minimizing error in the estimation function, the error determined by comparing the first imaged camera points to estimated points obtained by using the estimation function on the camera points $cam_j$ corresponding to the at least four projector points of the first test pattern 221. Such a process may be iterative such that a plurality of estimation functions are iteratively determined and the error determined on each, until the error is minimized and a current estimation function is used as the estimation function determined at the block 516.

At a block 518, the controller 320 controls the projector 207 to project, onto the surface 216, the second test pattern 222 comprising: a plurality of points determined from the predetermined correspondences, similar to as described above with respect to block 402. In general, a number of the plurality of points of the second test pattern 222 is greater than a respective number of points of the first test pattern 221.

At a block 520, the controller 320 controls the camera 208 to acquire a second image of the second test pattern 222, similar to as described above with respect to block 404.

At a block 522, the controller 320 determines second imaged camera points (referred to hereafter as second imaged camera points $cl_i$) in the second image, similar to as described above with respect to block 406.

Indeed, in examples, where the blocks 402, 404, 406 of the method 400 was implemented prior to implementation of the method 500 (e.g. when the method 500 is being implemented from the block 410 of the method 400), then the second imaged camera points obtained at the block 406 may be used in the second recalibration mode and/or the method 500 without implementing the blocks 518, 520, 522. At a block 524, the controller 320 generates updated correspondences between the camera points $cl_i$ and the projector points $proj_i$ in the current relative position using the estimation function and the second imaged camera points. Such generation will be described in more detail below and may depend on the estimation function determined at the block 516.

For example, the estimation function may comprise a homographic function for mapping between current camera points that correspond, via the function determined at the block 502, to the at least four projector points in the first test pattern 221 and the first imaged camera points in the first image, and the controller 320 may be further configured to generate the updated correspondences by: bijectively associating, using the homographic function, the camera points $cam_i$ in the predetermined correspondences with the second imaged camera points $cl_i$; and associating the second image camera points with the projector points $proj_i$ of the predetermined correspondences that correspond with the camera points $cam_i$ in the predetermined correspondences bijectively associated with the second imaged camera points; and storing, in the memory 322 (and/or another memory), the second image camera points with associated projector points $proj_i$ as the updated correspondences.

However, when the memory 322 further stores the camera characteristics 338 for the initial relative position, and the first test pattern 221 comprises at least six projector points, the estimation function may comprise a model for determining respective projector points from the second imaged camera points; the model may be further generated using the camera characteristics 338. In these examples, the controller 320 may be further configured to generate the updated correspondences by: bijectively associating using the model, the projector points $proj_i$ in the predetermined correspondences 230, with the second imaged camera points in the second image (e.g. by mapping the second imaged camera points $cl_i$ through the model, and then using a nearest neighbor approach, and the like, as described in more detail below); and storing, in the memory 322 (and/or another memory), the second image camera points with associated projector points $proj_i$ as the updated correspondences.

At a block 526, the controller 320 may use the updated correspondences to control the projector 207 to project images, for example by redetermining warping data and/or blend data and/or the pose data 109$p$ using the updated correspondences, for example similar to the block 414.

While the method 500 is described with respect to one camera 208 acquiring images of test patterns 221, 222 projected onto the surface 216, when the camera 208 is arranged to acquire only a portion of the first test pattern 221 as projected by the projector 207 onto the surface 216, the controller 320 may be in further communication with one or more second cameras 209 arranged to acquire a remaining portion of the first test pattern 221 as projected by the projector 207 onto the surface 216, and the first imaged camera points, that correspond to the at least four projector points, may include respective camera points from images of the first test pattern 221 acquired by both the camera 208 and the one or more second cameras 209.

Furthermore, a person of skill in the art understands that the blocks 518 to 526 generally correspond to the method 400 with, however, the updated correspondences generated using the estimation function at the block 524.

The methods 400 and 500 have been described with respect to the test pattern 222 being determined from the predetermined correspondences 230. In some examples, the test pattern 222 may comprise the projector points $proj_i$ of the predetermined correspondences 230, for example in a one-to-one relationship. However, the test pattern 222 may alternatively comprise a subset of the projector points $proj_i$ of the predetermined correspondences 230. In yet further examples, at least a portion of the test pattern 222 may be derived from the predetermined correspondences 230 but may not exactly correspond, either in position or number, to the projector points $proj_i$ of the predetermined correspondences 230. For example, areas of the test pattern 222 may be altered with respect to the projector points $proj_i$ of the predetermined correspondences 230 to increase density of projector points and/or change distribution of projector points as compared to the density and/or distribution of the projector points $proj_i$ of the predetermined correspondences 230, for example to enhance data collection is those areas. Hence, in some examples, then a new set of pre-determined correspondences C'0 may be calculated and used in place of the predetermined correspondences 230, C0 in either of the method 400 and/or the method 700 (as well as subsequent methods and examples described hereafter). For example, (similar to the block 510 of method 500), the function determined in block 502, mapping between the projector points and the camera points, can be used to determine camera points $cam'_i$ for any projector points $proj'_i$ points in the test pattern 222. Hence, a new set of pre-determined correspondences C'0 would be comprised of pairs ($M^{-1}$($proj'_i$), $proj'_i$), where M is the function determined at the block 502, $M^1$ is an inverse of the function determined at the block 502, and $M^{-1}$($proj'_i$) is a camera point $cam'_i$ point associated with a projector point $proj'_i$, with $M^{-1}$($proj'_i$) representing where the camera 208 would have seen the projector point $proj'_i$ if it had been represented in structured light patterns at the time of the initial calibration. Hence, in the method 400 and the method 500, the pre-determined correspondences C'0 may replace the predetermined correspondences 230, C0. Hence, in these example, the method 400 may include determining the function for mapping between projector points (and/or projector space) of the projector 207 and camera points (and/or camera space) of the camera 208, as described with respect to block 502 of the method 500. However, hereafter, examples of the method 400 and the method 500 are described with respect the predetermined correspondences 230, C0.

A person of skill in the art further understands that the second test pattern 222 generally includes a higher number of points than the first test pattern 221. Indeed, the number of points in the first test pattern 221 may generally set to a number between 4 and 10 (inclusive) to minimize processing time of the blocks 510, 512, 516. However, the number, arrangement of density of points of the second test pattern 222 is generally selected to cover the field of the projector 207 and/or to be of a suitable density and/or arrangement that enables a "good" recalibration. The number, arrangement of density of points of the second test pattern 222 may be configured by an administrator of the system 200 and/or may be automatically selected to be greater than a threshold number of points, for example 50 points, distributed over the field of the projector 207. Furthermore, the arrangement of the points of the second test pattern 222 may be a grid, and/or array and/or any other suitable arrangement (which may not be a grid and/or an array).

Figure 6:
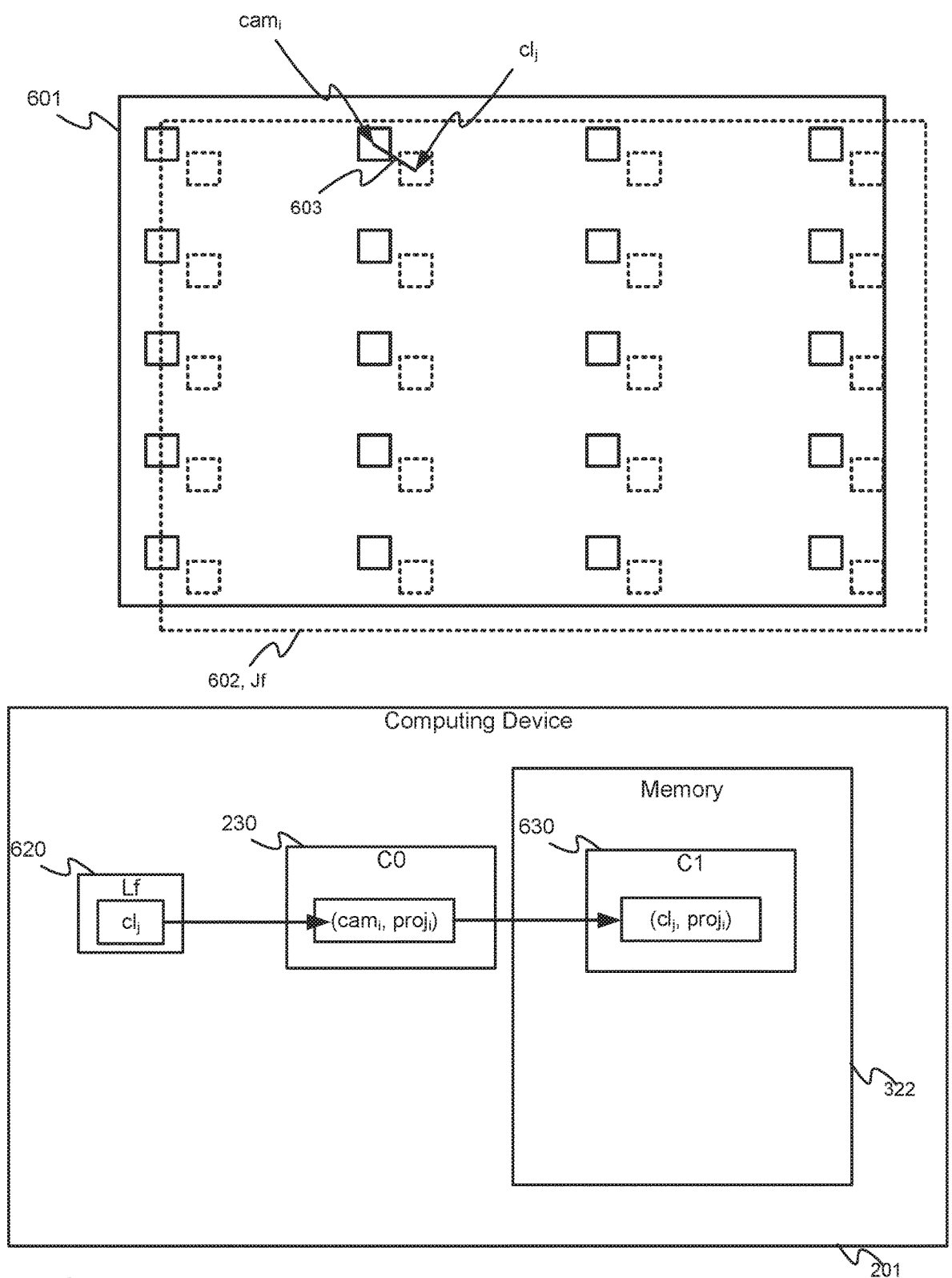
FIG. 6 depicts example images acquired by a camera of the system of FIG. 2 to show the relative movement of the projector of the system of FIG. 2, and further depicts determination of updated correspondences between the camera and the projector, according to non-limiting embodiments in a first recalibration mode.

The method 400 is next described with respect to FIG. 6. In particular, to illustrate the method 400, FIG. 6 depicts two camera images of the test pattern 222 acquired by the camera 208 before and after relative movement between the projector 207 and the camera 208. For example, the image 601 (depicted in solid lines) comprises an image of the test pattern 222 (e.g. as depicted a 5×4 portion of an 15×20 array of squares) as projected by the projector 207 onto the surface 216 for example prior to any relative movement between the projector 207 and the camera 208, and hence the predetermined correspondences 230 are valid and/or the predetermined correspondences 230 represents a valid calibration of the system 200 prior any relative movement. As such, the center of each square of the image 601 corresponds to a camera point $cam_i$ of the predetermined correspondences 230, with one such camera point $cam_i$ indicated in FIG. 6.

However, the image 602 (also referred to as Jf, hereafter, and depicted in broken lines) comprises an image of the test pattern 222 (e.g. as depicted a 5×4 portion of an 15×20 array of squares) as projected by the projector 207 (e.g. at the block 402 of the method 400) onto the surface 216 for example after relative movement between the projector 207 and the camera 208, and hence the predetermined correspondences 230 are no longer valid as squares in the image 602 have shifted with respect to the squares in the image 601. The image 602 generally comprises the image acquired by the camera 208 at the block 404 of the method 400.

The centers of the squares of the image 602 generally correspond to the imaged camera points determined at the block 406 of the method 400. For example, an imaged camera point $cl_j$, that corresponds to the indicated camera point $cam_i$ of the image 601, indicted in FIG. 6. Indeed, a person of skill in the art understands that each of the imaged camera point $cl_j$ of the image 602 may be bijectively associated with the camera points $cam_i$ of the image 601, and a line 603 between the indicated imaged camera point $cl_j$ of the image 601 and the indicated camera point $cam_i$ of the image 601 represents the distance a camera point has moved since the predetermined correspondences were determined.

Put another way, in the method 400, the test pattern 222, $T_f$ is projected by the projector 207 and the resulting camera image 602, $J_f$ is acquired by the camera 208. Also depicted in FIG. 6 is the computing device 201 and the predetermined correspondences 230 and using image analysis the structures and/or squares of the test pattern 222, $T_f$, can be located into a set of camera sensor locations 620, (also labelled $L_f$ in FIG. 6), one of which, the imaged camera point $cl_j$ is depicted, in FIG. 6.

From the previous calibration, the predetermined correspondences 230, C0 is stored in the memory 322, comprising a set of locations of camera points $cam_i$, each associated with locations of projector points $proj_i$. That is, each element of the predetermined correspondences 230, as described above, is a pair ($cam_i$, $proj_i$). Using a nearest-neighbor approach, the locations of camera points $cam_i$ in the predetermined correspondences 230, C0, that are closest to each of the imaged camera point $cl_j$ locations (e.g. the camera sensor locations) of the set of camera sensor locations 620, $L_f$, are determined. For example, as depicted in FIG. 6, the indicated imaged camera point $cl_j$ in the set of camera sensor locations 620, $L_f$ is closest to the indicated camera point $cam_i$ in the predetermined correspondences 230, C0. Hence, the indicated imaged camera point $cl_j$ is associated with the indicated camera point $cam_i$ in the predetermined correspondences 230, C0. And the indicated imaged camera point $cl_j$ in the set of camera sensor locations 620, $L_f$ is associated with the projector point $proj_i$ associated with the indicated camera point $cam_i$. Hence the pair ($cl_j$, $proj_i$) becomes a new camera-projector correspondence. When determined for each imaged camera point $cl_j$ in $L_f$, the pairs ($cl_j$, $proj_i$) are generated and stored in updated correspondences 630, C1, which is stored in the memory 322, as also depicted in FIG. 6.

Indeed, a person of skill in art understands that if the system 200 has not drifted or been perturbed too greatly since the predetermined correspondences 230, C0 were determined, then every imaged camera point $cl_j$ in the set of camera sensor locations 620, $L_f$ should map to a unique camera point $cam_i$ in the predetermined correspondences 230, C0, for example as a bijective association. In some examples, the test pattern 222 can be projected periodically in a projection mapping show, for example, every frame or every few frames (e.g. every one to four frames), and the method 400 may be implemented accordingly to track drift in the system 200.

Indeed, the differences and/or deltas (e.g. as represented by the line 603) between the associated camera points $cam_i$ and the imaged camera points $cl_j$ may be used to determine how much the system 200 has drifted, and whether or not to generate the updated correspondences 630, C1 to derive new geometry corrections for the images of the projection mapping show. For example, when the differences and/or deltas and/or an average thereof are below a threshold value (e.g. a few pixels and/or value configurable by an administrator of the system 200 and/or provided in the application 323), the updated correspondences 630, C1 may not be determined; however, when the differences and/or deltas and/or an average thereof are above the threshold value, the updated correspondences 630, C1 may be determined and replace the predetermined correspondences 230, C0.

Furthermore, when a bijective association between the imaged camera points $cl_j$ and the camera points $cam_i$ cannot be determined (e.g. the imaged camera points $cl_j$ are about halfway between the camera points $cam_i$), the method 500 may be implemented Attention is hence next directed to FIG. 7 to FIG. 10 which depicts an example of the method 500.

Figure 7:
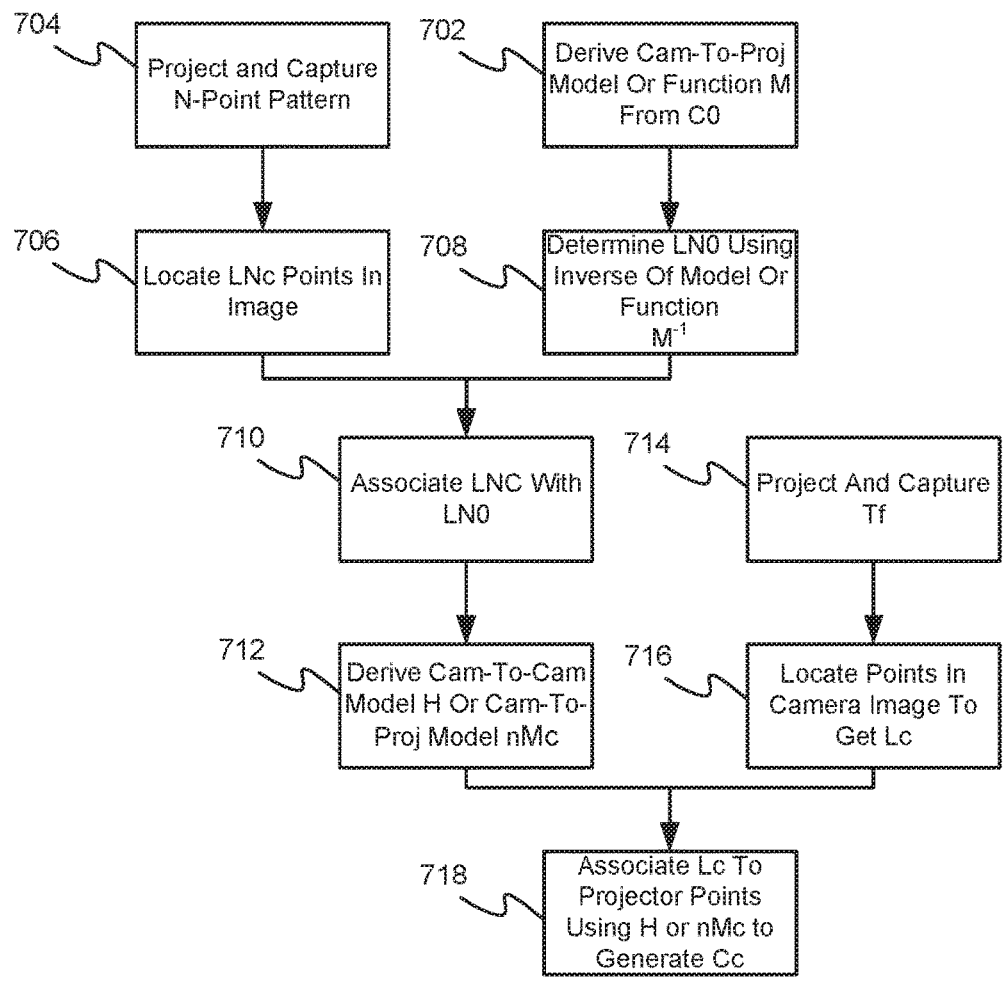
FIG. 7 depicts an example of the method of FIG. 5, according to non-limiting embodiments.

In particular, attention is first directed to FIG. 7 which depicts a method 700 that comprises an example of the method 500. As with the method 500, the method 700 need not be performed in the exact sequence as shown, unless otherwise indicated; and likewise, various blocks may be performed in parallel rather than in sequence; hence the elements of the method 700 are referred to herein as "blocks" rather than "steps". It is also to be understood, however, that the method 700 can be implemented in the system 200 and variations of the system 200. Furthermore, while the device 201 is described as implementing and/or performing at least a portion of the blocks of the method 700, it is appreciated that such blocks of the method 700 occur using the controller 320 processing application 323.

At a block 702, the controller 320, using the predetermined correspondences 230, C0, may generate a model or function M (e.g. at the block 502 of the method 500) that can map (e.g. in two-dimensions) locations of the camera points to locations of the projector points. For example, such an inverse of the model or function $M^{-1}$ could be used to map locations of the projector points $proj_i$ (and/or any other projector point) to locations of camera points $cam_i$ (and/or any camera point).

At a block 704, the controller 320 controls the projector 207 to project an "N-point" test pattern (e.g. the first test pattern 221), for example onto the surface 216, which is imaged by the camera 208 (e.g. the block 704 may correspond to the blocks 504, 506 of the method 500). In some examples, N may be selected to be 5 (e.g. the first test pattern 221 comprises 5 projector points and/or N=5). However the "N-point" test pattern may comprise at least four points (e.g. N=4) which: cover the projected image field of the projector 207; are separated by respective distances that enable the projector 207 and the camera 208 to move relative to each other, and relative to the initial relative position, such that the camera 208 acquires the at least four projector points in the image of the N-point test pattern acquired at the block 704; and are inset from edges of the image of the N-point test pattern.

Furthermore, the number of points of the "N-point" test pattern are generally selected to provide enough data to determine a chosen mathematical model of the movement of the N-points in a view of the camera 208 (e.g. an image acquired by the camera 208) from an initial calibration time (e.g. when the predetermined correspondences 230, C0 were determined) to a current calibration time.

At a block 706, the controller 320 may, using machine vision techniques, locate the N-points in the image acquired at the block 704. The block 706 generally corresponds to the block 508 of the method 500. The locations of the N-points are referred to at the block 706 as the locations of the LNc points; for example, when N=5, LNc may be set to L5c.

At a block 708, the controller 320 uses the inverse of the model or function $M^{-1}$ to determine the camera points LN0 that correspond to the at least four projector points (e.g. the N-points; the camera points LN0 represent where camera points would have been located at the N-point pattern been projected prior to any drift in the system 200. In the example where N=5, the locations of the camera points LN0 may be set to the locations of the camera points L50. The block 708 generally corresponds to the block 510 of the method 500.

A person of skill in the art furthermore understands the blocks 702, 708 may be implemented before or after or during implementation of the blocks 704, 706.

At a block 710, the controller 320 may associate N imaged camera points in the camera points LNc and/or the camera points L5c with the camera points in LN0 and/or the camera points L50. The block 710 generally corresponds to the block 512 of the method 500.

Indeed, the difference between the camera points LNc (and/or the camera points L5c) and the camera points LN0 (and/or the camera points L50) characterizes any drift that has occurred in the system 200 since the initial calibration. Hence, when the association does not occur bijectively, however, it is understood that the drift may be too great for the method 500 to be used to recalibrate the system 200; as such, when such a bijective association cannot be determined, the method 700 may end and a full calibration of the system 200 may occur as described with respect to the block 514 of the method 500.

Figure 8:
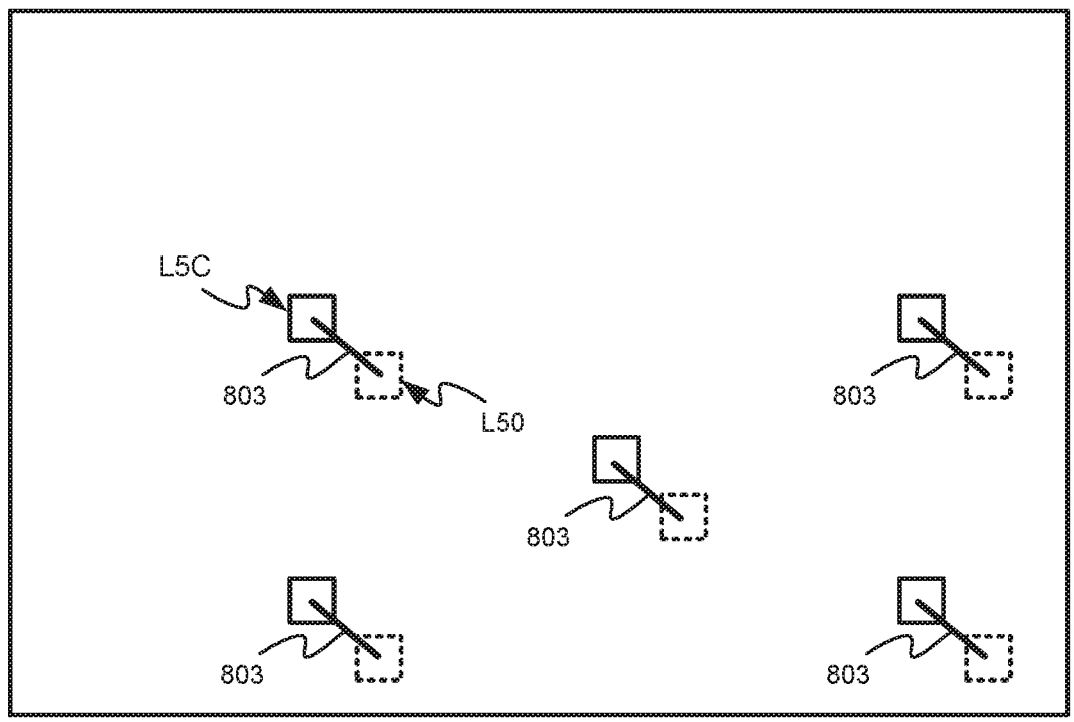
FIG. 8 depicts a 5-point pattern as acquired by the camera before and after drift, according to non-limiting embodiments.
Figure 9:
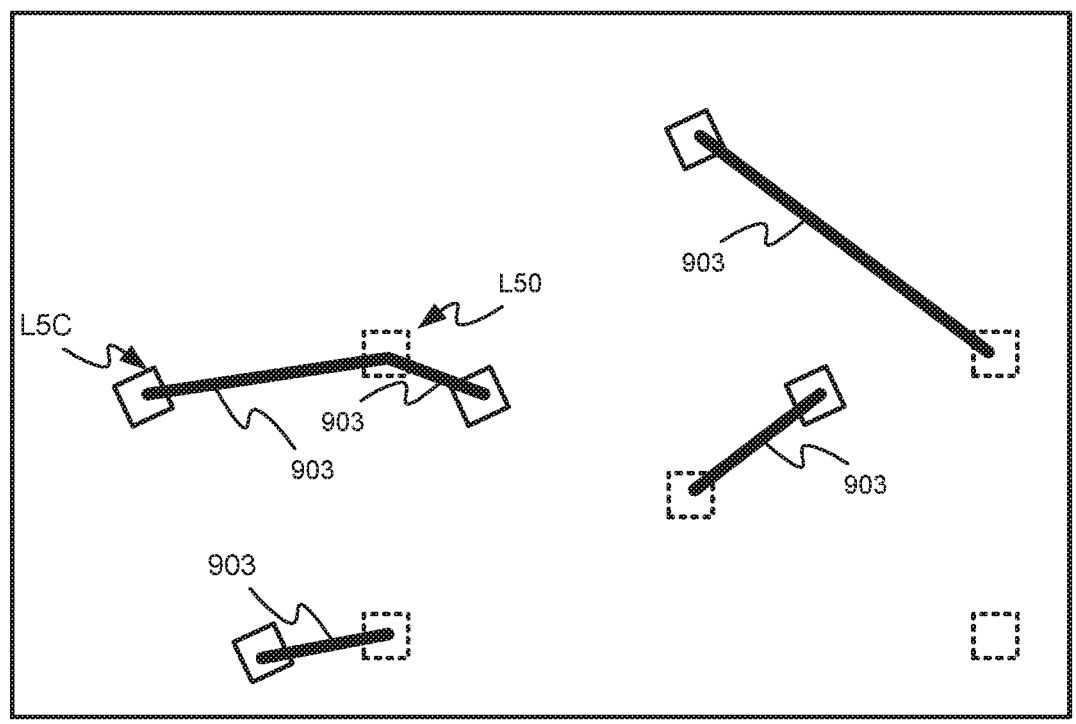
FIG. 9 depicts a 5-point pattern as acquired by the camera before and after drift, according to alternative non-limiting embodiments.

For example attention is briefly directed to FIG. 8 and FIG. 9, each of which depict an attempted association between the camera points L5C (depicted in solid lines) and the camera points LOC (depicted in broken lines). In FIG. 8 each of the camera points L5C are uniquely (e.g. bijectively) associated with corresponding camera points L50 (e.g. using a nearest neighbor approach), as represented by the lines 803; furthermore, like the line 603, the lines 803 represent a shift in the camera points from the initial relative position of the projector 207 and the camera 208, and after the system 200 has drifted.

However, as clearly seen in FIG. 9, in some example, each of the camera points L5C may not be uniquely (e.g. bijectively) associated with corresponding camera points L50 (e.g. when using a nearest neighbor approach). For example, in FIG. 9, one camera point L50 is associated with two camera points LSC, as represented by the lines 903, and one camera point L50 is not associated with any camera points LSC. Hence, for example, the projector 207 (and/or the camera 208) may have experienced movement and/or rotation too large to be recalibrated by the method 500 and/or the method 700.

Returning to FIG. 7, at a block 712, the controller 320 derives and/or determines an estimation function including, but not limited to a camera-to-camera transformation model and/or a homographic function H based on the corresponding points in the camera points LNc and in the camera points LN0 that maps projector points imageable by the camera 208 (e.g. in a view of the camera 208) after the drift (e.g. at a present time) to projector points imageable by the camera 208 at the time of the initial calibration (e.g. before the drift). Alternatively, the estimation function may include, but is not limited to a camera-to-projector transformation model nMc for determining respective projector points from the imaged camera points. However, the method 700 will first be described with respect to a homographic function H. A person of skill in the art understands that that any two images of a same planar surface (e.g. by two cameras) may be related by a homography, and hence a homographic function comprises a function for mapping a flat surface between two camera views, for example a mapping between views of the surface 216 by the camera 208 before and after drift of the system 200. Indeed, a person of skill in the art understands that, as the surface 216 may not be flat, an estimation function that comprises a homographic function is estimation of such a mapping of the surface 216, which models movement of camera points as if the surface 216 was flat. Hence, homographic functions as described herein provide a first approximation and/or estimation of such movement of the camera points when the cameras 208 images the surface 216. However, the estimation function described herein need not be homographic but rather may be any suitable function for mapping between camera views including, but not limited to, a polynomial model and/or function for mapping between xy coordinates in views of the surface 216 by the camera 208 before and after drift of the system 200, and the like.

In general, an estimation function is generated and/or derived by determining a model and/or function which maps the camera points LNc to the camera points LN0 and generally represents a mathematical model of the determined bijective association between the camera points LNc and in the camera points LN0. Hence, the estimation function is generally be used to predict where projected projector points acquired by the camera 208 "now" would have been located in a camera view if imaged by the camera 208 when projected at the time of the initial calibration.

At a block 714, the controller 320 controls the projector 207 to project the second test pattern 222, Tf onto the surface 216, and controls the camera 208 to image the points of the projected test pattern 222 to acquire an image of the second test pattern 222, Tf projected onto the surface 216 (e.g. the block 714 generally corresponds to the blocks 518, 520 of the method 500).

At the block 716, the controller 320 uses machine vision techniques, and the like, to locate and/or determine the imaged camera points in the image acquired by the camera 208 at the block 714 to generate a set of camera locations Lc (e.g. the block 716 generally corresponds to the block 522 of the method 500), for example similar to the camera points $cl_j$. Indeed, in these examples, the set of camera locations Lc may also be referred to as including camera points $cl_j$, as the set of camera locations Lc is generally analogous to the set of camera sensor locations 620, $L_f$.

At a block 718, the imaged camera points located and/or determined at the block 716 are associated locations of projector points to generate updated correspondences Cc between camera points and the projector points $proj_i$ (e.g. the block 718 generally corresponds to the block 524 of the method 500).

Each point in camera point $cl_j$ in the set of camera locations Lc may be mapped using the homographic function H from a camera-sensor space at a time "now" to the camera-sensor space at a time of initial calibration:

$$cl'_j = H(cl_j) \qquad \text{Equation (1)}$$

For example, using Equation (1), a camera point $cl'_j$ at a time of initial calibration that corresponds to a camera point $cl_j$ at a current "now" time may be determined by inputting the camera point $cl_j$ into the homographic function H.

The camera point $cl'_j$ generally represents an estimation of where the camera would have seen (at the time of the initial calibration) a projector point that corresponds to the camera point $cl_j$ of the set of camera locations Lc.

Figure 10:
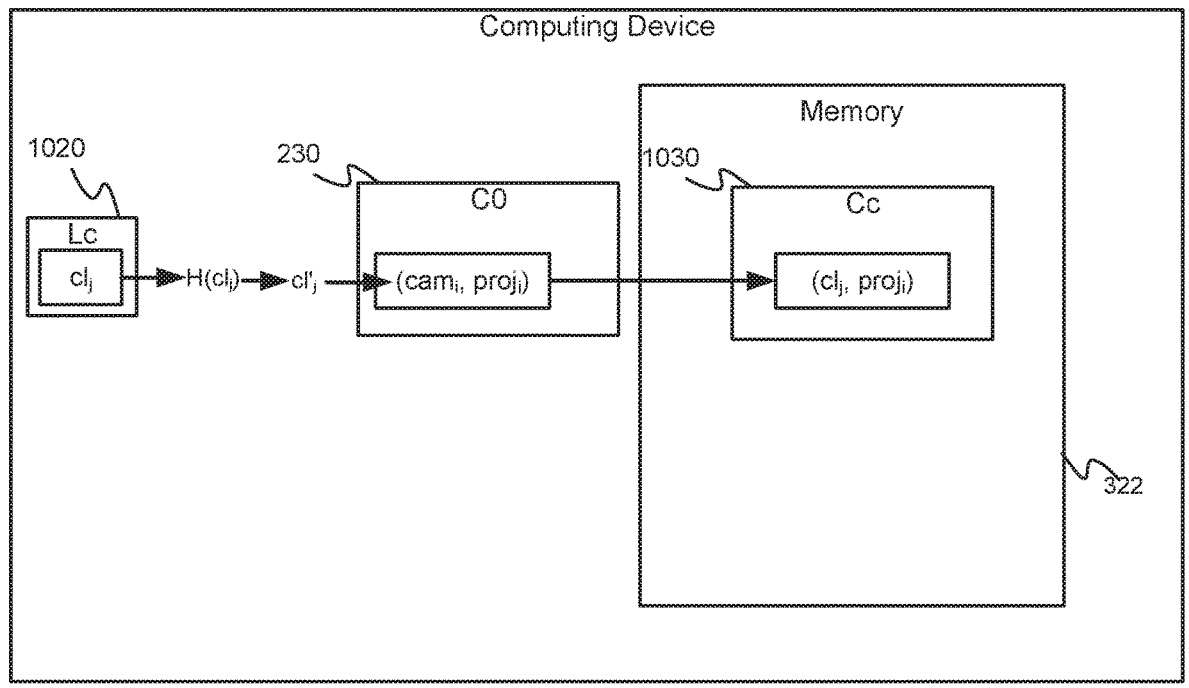
FIG. 10 depicts determination of updated correspondences between the camera and the projector, according to non-limiting embodiments in a second recalibration mode.

With reference to FIG. 10, which depicts the computing device 201 after a set of camera locations 1020 Lc has been determined, the homographic function H is used to generate estimates of the camera point $cl'_j$ for each of the camera points $cl_j$ of the set of camera locations 1020, Lc. For example, in FIG. 10, the camera points $cl_j$ is used as input to the homographic function H to generate the camera point $cl'_j$. The camera point $cl'_j$ is compared to the known camera points $cam_i$ in the predetermined correspondences 230, C0, to determine an associated pair ($cam_i$, $proj_i$) (e.g. camera point $cl'_j$ is the same and/or closest to the camera point $cam_i$ of the pair ($cam_i$, $proj_i$). Indeed, the controller 320 may associate each camera point $cl_j$ with a camera point $cam_i$ from the predetermined correspondences 230, C0, for example by determining a corresponding camera point $cl'_j$ for a given camera point $cl_j$ and determining a camera point $cam_i$ from the predetermined correspondences 230, C0 that corresponds to the camera point $cl'_j$. Since the camera points $cam_i$ are associated with projector points $proj_i$ in the predetermined correspondences 230, C0, they are already identified with projector points, and updated correspondences 1030, Cc are generated.

The block 710 of the method 700 is now described in further detail. Furthermore, hereafter, references to LNc, LN0 etc., are understood to be the set of the camera points LNc, the set of the camera points LN0, etc.

Any method for matching the locations of LNc bijectively with locations of LN0 are within the scope of the present specification including, but not limited to an Iterative Closest Point (ICP) algorithm.

Indeed, in some examples, a nearest neighbor algorithm may be used in conjunction with an ICP algorithm. For example, as described with reference to FIG. 8 and FIG. 9 for N=5, for each point located in L5c, a nearest camera point in L50 is determined. If after this process each camera point in L5C has been paired with a unique camera point in L50 (as in FIG. 8), then the method 700 continues. However, when two or more of the locations in L5C map to the same location in L50 (as in FIG. 9), then the method 700 ends.

Alternatively, the block 710 and the block 712 may be implemented together. For example, since N may be chosen to be "small", there may be a tractable (e.g. a computationally reasonable) number of associations between LNc and LN0. When the number of data points N over-determines the homographic function H, then for each, possible association between the respective camera points of LNc and LN0, an error of a generated homographic function H may be determined and tested against the known camera points in LNc and LN0.

For example, an error e may be defined for each matched pair in the LNc/LN0 sets by comparing the known location at the initial calibration time to how a homographic function H maps a current location to the initial calibration time.

An example of an error function is:

$$\forall cl_i \in LN_c; e_i = \|cl_j - H(cl_i)\| \qquad \text{Equation (2)}$$

where $cl_j \in LN_0$ is associated with $cl_i$

Then the association between the camera points $cl_i$ of LNc and the camera points $cl_j$ of LN0 that minimizes the error in the derived homographic functions H is used to determine the homographic function H to use at the block 718.

The block 712 of the method 700 is now described in further detail.

Any process to derive and/or generate two dimensional transformation models for camera points viewed in a three dimensional space is also within the scope of the present specification. Regardless the process used derive an estimation function (e.g. the homographic function H and/or the model nMc) should be well matched with the chosen number of points N.

For example, a linear transformation (a homography) can be determined by 4 pairs of two dimensional points. Hence, when N=4, then the identified points in LNc and LN0 can determine the homographic function H. This approach may be useful when the projection surface 216 is known to be near-flat, and/or if the projector "drift" is assumed to be mostly rotational or approximately rotational.

Alternatively, in some examples the camera characteristics 338 have been determined and are available to the controller 320, including, but not limited to, camera position, orientation and intrinsics (lens characteristics) with respect to the surface 216. In these examples, the three dimensional coordinates of the N projector points as imaged by the camera 208 may be determined; hence the N projector points may be identified using three dimensional coordinates.

In examples where N>=6 (e.g. N is at least 6), there may be enough data to determine the position, orientation and lens intrinsics of the projector 207 in space relative to the surface 216, which may be sufficient to derive a pose-based model that can predict where projector points are projected on the surface 216, and hence where the camera 208 would image a projector point at a current time (e.g. after the drift). This data, with the function and/or model M generated at the block 502 of the method 500 and/or the block 702 of the method 700 may be generally sufficient to determine the estimation function determined at the block 516 of the method 500 and/or the block 712 of the method 700.

In yet further examples, where N>=6 and the camera characteristics 338 are available, using the projector-pose model, a camera-to-camera estimation function (such as the homographic function H) may not be generated. Rather, a camera-to-projector model $_nM_c$ may be generated. The model $_nM_c$ may then be applied to the set of camera locations 1020 Lc to determine points in projector space (instead of camera space) which could then be identified with the projector points of the predetermined correspondences 230, $C_0$ (or the projector points of the second test pattern 221, $T_f$) in order to the updated correspondences 1030, Cc.

Indeed, in any of the examples described herein, the bijective association between camera points and projector points may occur in camera space (e.g. as described herein) or projector space.

Furthermore, for any process described herein that is over-determined (e.g. using 5 or more points for the homography approach, or 7 or more points for the pose-based approach), then the error equation of Equation (2) can provide a way to reject the estimation function. In examples where the model nMc is over-determined, a Direct Linear Transform (DLT) may be used to solve for the nMc.

For example, given the predetermined correspondences 230, C0, a minimum distance (dim) may be determined between the camera points of the predetermined correspondences 230, C0 in the camera view. When error $e_i$ in the error calculations exceed half this distance, then the controller 320 can be configured to determine that the nearest neighbor association of $H(l_i)$ with a camera point $cam_j$ in the predetermined correspondences 230, C0 is likely to be incorrect. Conversely, a percentage of $d_{min}$ may be chosen as a threshold beyond which any $e_i$ error should not exceed, otherwise an estimation function (and indeed the reduced test-pattern process) is rejected. The percentage threshold of $d_{min}$ may be selected to less than or equal to 50% to avoid misidentification using a nearest neighbor identification approach.

The block 718 of the method 700 is next described in further detail.

Once an estimation function (e.g. the homographic function H or the model $_nM_c$) has been used to estimate camera point (or projector point) locations at the initial calibration time for the points of a set of camera locations 1020 Lc, these points may be associated with the camera points (or projector points) in the predetermined correspondences 230, C0.

As in the discussion of the block 710, any suitable process for identifying sets of points in the same space (e.g. camera space or projector space) is within the scope of the present specification; in particular, however, such processes may take advantage of minimization of the difference between these sets of points as described herein.

For example, if using a cam-to-cam homographic function H, in some examples a nearest-neighbor approach may be used to associate a camera point $cl_i$ in set of camera locations 1020 Lc with a camera point $cam_i$ in the predetermined correspondences 230, C0 that $H(cl_i)$ is closest to. If this results in any duplicate matches then either a process can be abandoned or all duplicitous correspondence points can be thrown out.

As described above, the methods described herein may be extended to multicamera systems, for example when the camera 208 and the camera 209 both image projected images on the surface 216, as projected by the projector 207.

Indeed, the description herein of the second recalibration mode assumes that the camera 208 can image all N points of the N-point pattern in order to derive the estimation function that assists in developing camera-to-projector correspondences for all the points of the second test pattern 222, $T_f$.

However, in many multi-projector systems, it is not possible to have a single camera image all projected images for every projector. It is common that no one camera is arranged to image all of a given projector's projected images. In these examples, a projector-pose approach may be applied.

For example, when the system 200 comprises a two camera system, and initial predetermined correspondences $C^1_0$, $C^2_0$ have been respectively determined between each of the cameras 208, 209 and the projector 207, assuming, for example, that each of the cameras 208, 209 image at least a portion of images projected by the projector 207. An initial function mapping each of the cameras to the projector (e.g. a function M' for the camera 208 and the projector 207, and a function $M^2$ for the camera 209 and the projector 207) can be determined from the respective predetermined correspondences $C^1_0$, $C^2_0$. These functions $M^1$ $M^2$ may be used to determine corresponding respective camera points $LN^1_0$, $LN^2_0$ of an N-point projector test pattern projected by the projector (e.g. the first test pattern 221). After the N-point pattern is projected, a respective set of camera points $LN^1_C$, $LN^2_C$ may be determined for each camera 208, 209, but a single set of the camera points $LN^1_C$, $LN^2_C$ may not include imaged camera points that correspond to all N projected points. The points of $LN^1_C$ and $LN^2_C$ may still be associated with the points of $LN^1_0$ and $LN^2_0$ respectively (for example, using a nearest neighbor approach).

For example, the camera points $LN^1_c$, $LN^2_c$ may be ray-cast to the surface 216.

Any locations in the camera points $LN^1_c$ and $LN^2_c$ that are co-associated with a projector point of the N-point test pattern may be averaged (or otherwise combined) in three dimensional space. Thus when the camera 208 and the camera 209, together, image the entirety of a projected image of an N-point test pattern of a projector 207, then the result will be "N" points in three dimensional space. If N>=6, then as above, an estimated pose for the projector can be determined, and the camera-projector model $_nM_c$ may be determined.

Described herein is a device, system and method for generating updated camera-projector correspondences from a reduced set of test patterns. Current methods for determining projector-camera correspondences for projectors may require 10 or more test patterns/structured light patterns from each projector, and the subsequent processing of 10 or more test patterns/structured light patterns for each camera-projector pair. This data gathering phase can be time consuming in a system calibration process when warps and blends and the like are to be applied to projected images projecting on a projection surface. In a large-scale system, that may include, for example, six or more cameras, ten or more projectors, this process can take many minutes. If the process needs to be iterated many times during an installation, or during maintenance, then the total time spent calibrating can be in the hours.

Hence, the device, system and method provided in the present specification generally reduces the number of test patterns used to recalibrate camera-projector systems which can significantly reduce the time to recalibrate. In a first recalibration mode a test pattern comprising a plurality of points over a projector field are projected, for example, by inserting the test pattern into projected images, which are captured by a camera, for example at high frequency (e.g. every one to four frames). Using the first recalibration mode, plus an original set of correspondences between camera points and projector points (e.g. of an initial calibration), a computing device may determine if and when the system drifts or is perturbed, and then optionally performs a system calibration process to correct for the drift. This first recalibration mode may be reliable as long as the system does not shift drastically (more than a couple of projector pixels) from one test-pattern to the next.

In the second recalibration mode, calibration may not occur continuously, and the system could drift significantly between calibrations. Hence, two test patterns are used to establish the correspondences after an original set of correspondences between camera points and projector points (e.g. of an initial calibration) have been determined. An initial test pattern contains sparse and easily identified structures, and includes four or more projector points, and is used to roughly characterize any movement of the camera/projector system since the initial correspondences were determined. A second test pattern may include the full set of projector light structures used to determine a more completed set of camera-projector updated correspondences. The initial correspondences, plus the movement characterization, may enable an accurate association of all the structures and/or projector points in the second test pattern with associated camera points and hence establish the updated correspondences.

The various recalibration modes may provide several advantages which may include the following.

"Continuous" and/or periodic monitoring of projection system alignment (e.g. in in the first recalibration mode)

Fewer test patterns projected as compared to a full calibration (e.g. using ten or more structured light patterns), therefore fewer camera images are acquired, which may reduce the overall time for a recalibration (e.g. as compared to a full calibration using ten or more structured light patterns).

Error robustness. Every unique test pattern image used in a calibration is an opportunity for error to enter the system (e.g. projector/camera obstructions, environmental factors). When fewer unique test patterns are used, then repetition of test patterns can be used to flush out error without incurring a time penalty as compared to a full calibration.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some embodiments, the terms are understood to be "within 10%," in other embodiments, "within 5%", in yet further embodiments, "within 1%", and in yet further embodiments "within 0.5%".

Persons skilled in the art will appreciate that in some embodiments, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other embodiments, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative embodiments and modifications possible, and that the above examples are only illustrations of one or more embodiments. The scope, therefore, is only to be limited by the claims appended hereto.

What is claimed is:

1. A device comprising:
    a controller in communication with: a projector and a camera having a common field of view at a surface; and
    a memory storing predetermined correspondences between projector points and camera points in an initial relative position of the projector and the camera,
    the controller configured to:
        determine, from the predetermined correspondences, a function for mapping between the projector points and the camera points;
        control the projector to project, onto the surface, a first test pattern comprising: at least four projector points which cover a projected image field of the projector;
        control the camera to acquire a first image of the first test pattern;
        determine first imaged camera points in the first image;
        determine, using the function, corresponding camera points that correspond to the at least four projector points in the first test pattern;
        associate the first imaged camera points with the corresponding camera points to determine an estimation function for estimating movement of one or more of the camera points due to relative movement of the projector and the camera from the initial relative position to a current relative position;
control the projector to project, onto the surface, a second test pattern comprising: a plurality of points determined from the predetermined correspondences, a number of the plurality of points of the second test pattern being greater than a respective number of points of the first test pattern;
control the camera to acquire a second image of the second test pattern;
determine second imaged camera points in the second image;
generate updated correspondences between the camera points and the projector points in the current relative position using the estimation function and the second imaged camera points; and
use the updated correspondences to control the projector to project images.

2. The device of claim 1, wherein the estimation function comprises a homographic function for mapping between current camera points that correspond, via the function, to the at least four projector points in the first test pattern and the first imaged camera points in the first image, and the controller is further configured to generate the updated correspondences by:
bijectively associating, using the using the homographic function, the camera points in the predetermined correspondences with the second imaged camera points; and
associating the second image camera points with the projector points of the predetermined correspondences that correspond with the camera points in the predetermined correspondences bijectively associated with the second imaged camera points; and
storing, in the memory, the second image camera points with associated projector points as the updated correspondences.

3. The device of claim 2, wherein the controller is further configured to generate the homographic function when the first test pattern comprises four projector points or five projector points.

4. The device of claim 2, wherein the at least four projector points in the first test pattern include:
points at each of four corners of the first test pattern; and
a point at about a middle of the first test pattern.

5. The device of claim 1, wherein the controller is further configured to associate the first imaged camera points with the corresponding camera points based on minimizing error in the estimation function, the error determined by comparing the first imaged camera points to estimated points obtained by using the estimation function on the camera points corresponding to the at least four projector points.

6. The device of claim 1, wherein the memory further stores camera characteristics for the initial relative position, the first test pattern comprises at least six projector points, and the estimation function comprises a model for determining respective projector points from the second imaged camera points, the model further generated using the camera characteristics, and the controller is further configured to generate the updated correspondences by:
bijectively associating, using the model, the projector points in the predetermined correspondences, with the second imaged camera points in the second image; and
storing, in the memory, the second image camera points with associated projector points as the updated correspondences.

7. The device of claim 1, wherein the controller is further configured to, when a bijective association the first imaged camera points with the corresponding camera points cannot be determined:
fully regenerate correspondences between the projector points and the camera points using a plurality of structured light test patterns.

8. The device of claim 1, wherein the at least four projector points of the first test pattern are selected to:
cover the projected image field of the projector;
be separated by respective distances that enable the projector and the camera to move relative to each other, and relative to the initial relative position, such that the camera acquires the at least four projector points in the first image; and
be inset from edges of the first image as projected onto the surface.

9. The device of claim 1, wherein the camera is arranged to acquire only a portion of the first test pattern as projected by the projector onto the surface, and the controller is further in communication with one or more second cameras arranged to acquire a remaining portion of the first test pattern as projected by the projector onto the surface, and the first imaged camera points, that correspond to the at least four projector points, includes respective camera points from images of the first test pattern acquired by both the camera and the one or more second cameras.

10. The device of claim 1, wherein the controller is further configured to control the projector to projector to project the first test pattern and the second test pattern, while projecting the images, prior to generating the updated correspondences, at a rate that is not visible according to a human visual system model.

11. A method comprising:
determining, at a controller of a computing device, from predetermined correspondences between projector points and camera points in an initial relative position of a projector and a camera having a common field of view at a surface, a function for mapping between the projector points and the camera points;
controlling, using the controller, the projector to project, onto the surface, a first test pattern comprising: at least four projector points which cover a projected image field of the projector;
controlling, using the controller, the camera to acquire a first image of the first test pattern;
determining, using the controller, first imaged camera points in the first image;
determining, via the controller using the function, corresponding camera points that correspond to the at least four projector points in the first test pattern;
associating, using the controller, the first imaged camera points with the corresponding camera points to determine an estimation function for estimating movement of one or more of the camera points due to relative movement of the projector and the camera from the initial relative position to a current relative position;
controlling, using the controller, the projector to project, onto the surface, a second test pattern comprising: a plurality of points determined from the predetermined correspondences, a number of the plurality of points of the second test pattern being greater than a respective number of points of the first test pattern;
controlling, using the controller, the camera to acquire a second image of the second test pattern;
determining, using the controller, second imaged camera points in the second image;

generating, using the controller, updated correspondences between the camera points and the projector points in the current relative position using the estimation function and the second imaged camera points; and using, at the controller, the updated correspondences to control the projector to project images.

12. The method of claim 11, wherein the estimation function comprises a homographic function for mapping between current camera points that correspond, via the function, to the at least four projector points in the first test pattern and the first imaged camera points in the first image, and method further comprises generating the updated correspondences by:

bijectively associating, using the using the homographic function, the camera points in the predetermined correspondences with the second imaged camera points; and associating the second image camera points with the projector points of the predetermined correspondences that correspond with the camera points in the predetermined correspondences bijectively associated with the second imaged camera points; and storing, in a memory, the second image camera points with associated projector points as the updated correspondences.

13. The method of claim 12, further comprising generating the homographic function when the first test pattern comprises four projector points or five projector points.

14. The method of claim 12, wherein the at least four projector points in the first test pattern include:

points at each of four corners of the first test pattern; and a point at about a middle of the first test pattern.

15. The method of claim 11, further comprising associating the first imaged camera points with the corresponding camera points based on minimizing error in the estimation function, the error determined by comparing the first imaged camera points to estimated points obtained by using the estimation function on the camera points corresponding to the at least four projector points.

16. The method of claim 11, wherein the controller has access to a memory storing camera characteristics for the initial relative position, the first test pattern comprises at least six projector points, and the estimation function comprises a model for determining respective projector points from the second imaged camera points, the model further generated using the camera characteristics, and method further comprises generating the updated correspondences by:

bijectively associating, using the model, the projector points in the predetermined correspondences, with the second imaged camera points in the second image; and storing, in the memory, the second image camera points with associated projector points as the updated correspondences.

17. The method of claim 11, further comprising, when a bijective association the first imaged camera points with the corresponding camera points cannot be determined:

fully regenerating correspondences between the projector points and the camera points using a plurality of structured light test patterns.

18. The method of claim 11, wherein the at least four projector points of the first test pattern are selected to:

cover the projected image field of the projector;

be separated by respective distances that enable the projector and the camera to move relative to each other, and relative to the initial relative position, such that the camera acquires the at least four projector points in the first image; and be inset from edges of the first image as projected onto the surface.

19. The method of claim 11, wherein the camera is arranged to acquire only a portion of the first test pattern as projected by the projector onto the surface, and the controller is further in communication with one or more second cameras arranged to acquire a remaining portion of the first test pattern as projected by the projector onto the surface, and the first imaged camera points, that correspond to the at least four projector points, includes respective camera points from images of the first test pattern acquired by both the camera and the one or more second cameras.

20. The method of claim 11, further comprising controlling the projector to projector to project the first test pattern and the second test pattern, while projecting the images, prior to generating the updated correspondences, at a rate that is not visible according to a human visual system model.

\* \* \* \* \*